(12) United States Patent
Machida

(10) Patent No.: US 7,501,147 B2
(45) Date of Patent: Mar. 10, 2009

(54) METHOD OF COATING FUEL CELL SEPARATOR WITH SEAL MATERIAL

(75) Inventor: Akiyoshi Machida, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 706 days.

(21) Appl. No.: 10/483,355

(22) PCT Filed: Jul. 11, 2002

(86) PCT No.: PCT/JP02/07061

§ 371 (c)(1),
(2), (4) Date: Jan. 9, 2004

(87) PCT Pub. No.: WO03/007408

PCT Pub. Date: Jan. 23, 2003

(65) Prior Publication Data

US 2004/0170756 A1    Sep. 2, 2004

(30) Foreign Application Priority Data

Jul. 11, 2001  (JP)  ............................. 2001-211344
Jul. 11, 2001  (JP)  ............................. 2001-211356

(51) Int. Cl.
  *B05D 5/12*  (2006.01)
  *B05D 5/00*  (2006.01)
(52) U.S. Cl. .................. 427/115; 427/284; 427/287
(58) Field of Classification Search ............ 427/115, 427/284, 287, 356, 421.1; 429/35, 36, 38, 429/39
See application file for complete search history.

(56) References Cited

U.S. PATENT DOCUMENTS

| 5,464,700 | A | * | 11/1995 | Steck et al. ............... 429/30 |
| 5,708,913 | A | | 1/1998 | Yasuhara et al. |
| 5,985,069 | A | | 11/1999 | Kawabe et al. |
| 6,689,504 | B1 | * | 2/2004 | Matsumoto et al. ....... 429/39 |
| 6,699,613 | B2 | * | 3/2004 | Inoue et al. .............. 429/35 |
| 6,730,426 | B2 | * | 5/2004 | Wangerow ............... 429/35 |

(Continued)

FOREIGN PATENT DOCUMENTS

EP    0 528 047 A1    2/1993

(Continued)

*Primary Examiner*—Brian K Talbot
(74) *Attorney, Agent, or Firm*—Rankin, Hill & Clark LLP

(57) ABSTRACT

A method for coating a liquid sealant (61) at a periphery of a gas flow path and a water flow path on a separator for a fuel cell (57), including the steps of, at a coating-start portion (63) of the sealant, making a nozzle portion (33) provided at the sealant coating apparatus (24) be nearer to the separator than at portions other than the coating-start portion, and moving the nozzle portion at a horizontal moving velocity which is slower than at the portions other than the coating-start portion. By making the nozzle portion be near to the separator, pressing force pressing the sealant which is discharged from the nozzle portion against the separator becomes large, and turning up of a distal end portion of the sealant can be prevented by making the sealant adhere more to the separator. Further, by lowering the horizontal moving velocity of the nozzle portion, the sealant can be coated at a more uniform thickness.

2 Claims, 23 Drawing Sheets

U.S. PATENT DOCUMENTS 6,777,127 B2 * 8/2004 Einhart et al. .................. 429/35
7,138,201 B2 * 11/2006 Inoue et al. .................... 429/35

FOREIGN PATENT DOCUMENTS

| FR | 2 741 438 A1 | | 5/1997 |
|---|---|---|---|
| JP | 59-061878 | * | 4/1984 |
| JP | SHO-59-61878 | | 4/1984 |
| JP | 61-216250 | * | 9/1986 |
| JP | 63-043264 | | 2/1988 |
| JP | HEI-5-66876 | | 12/1991 |
| JP | HEI-4-118166 | | 10/1992 |
| JP | 2000-123848 | | 4/2000 |
| JP | 2001-196078 | | 7/2001 |

* cited by examiner

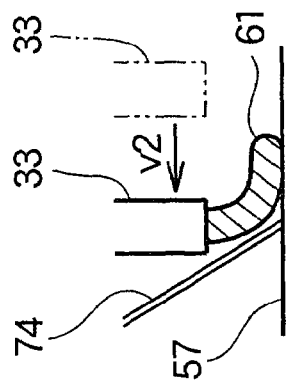
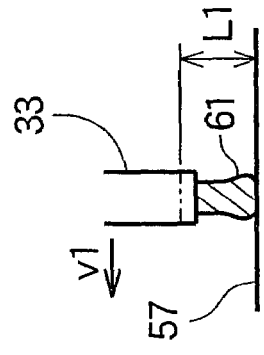
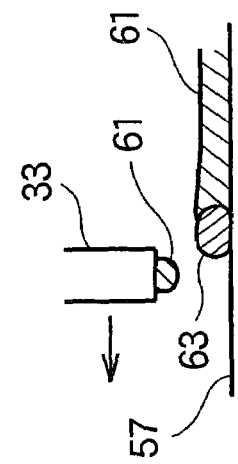
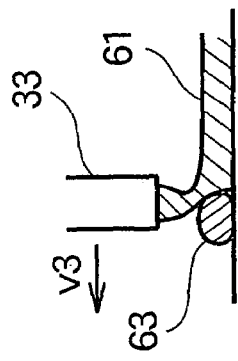
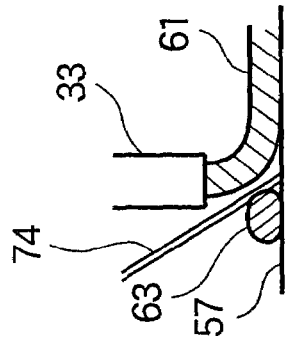

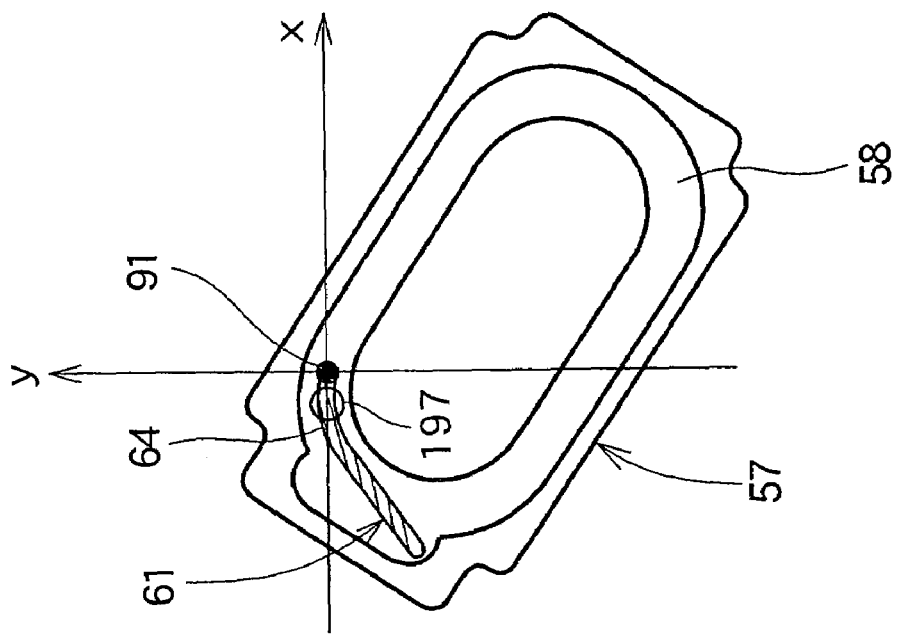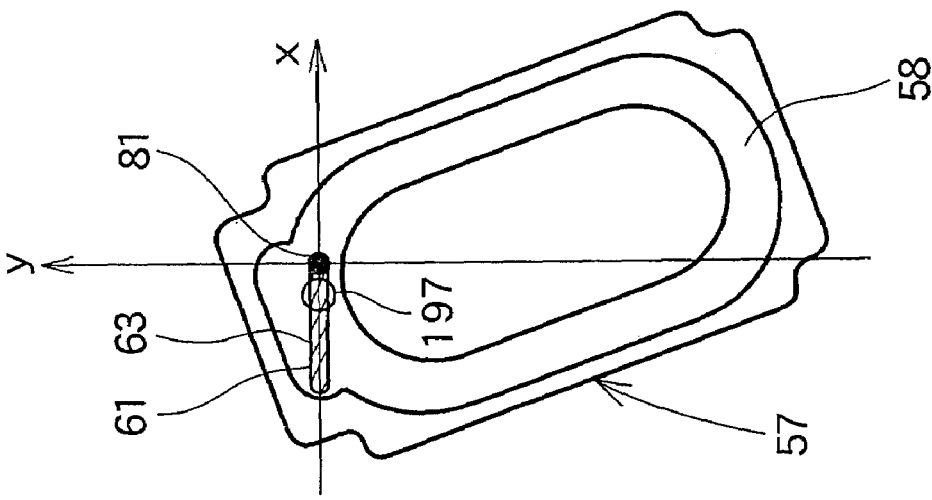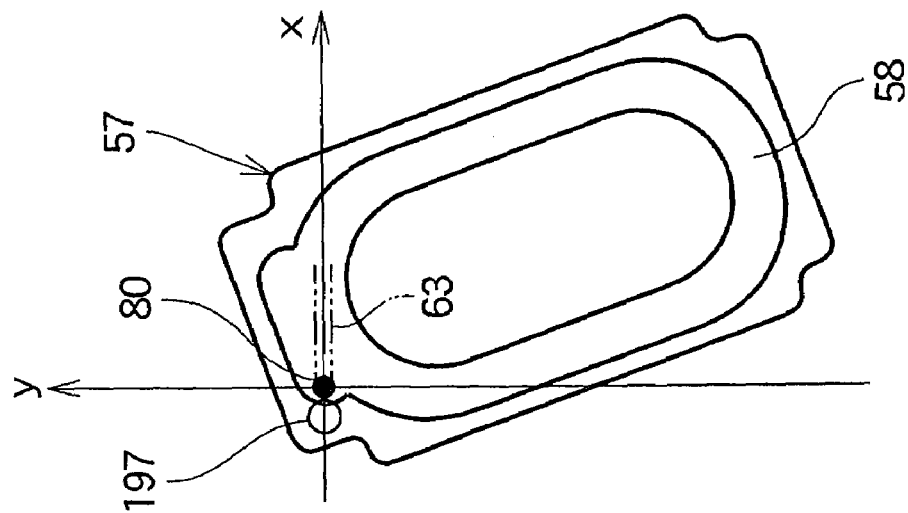

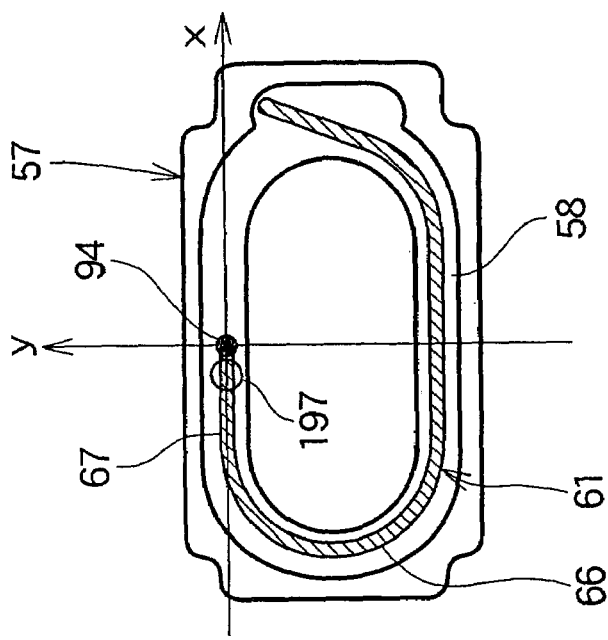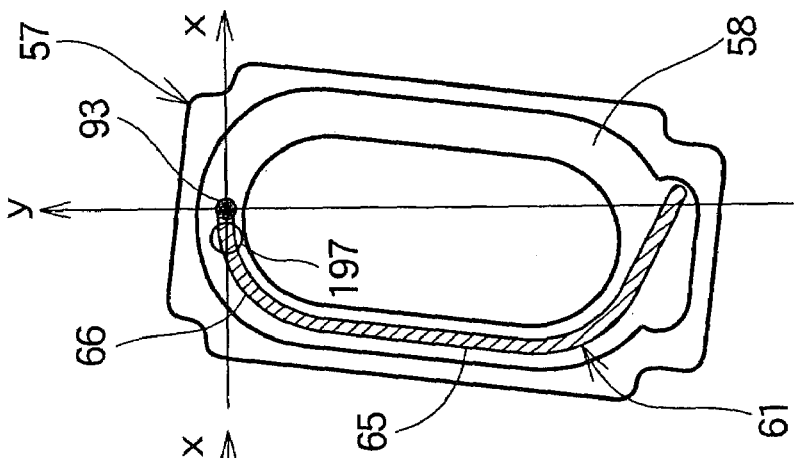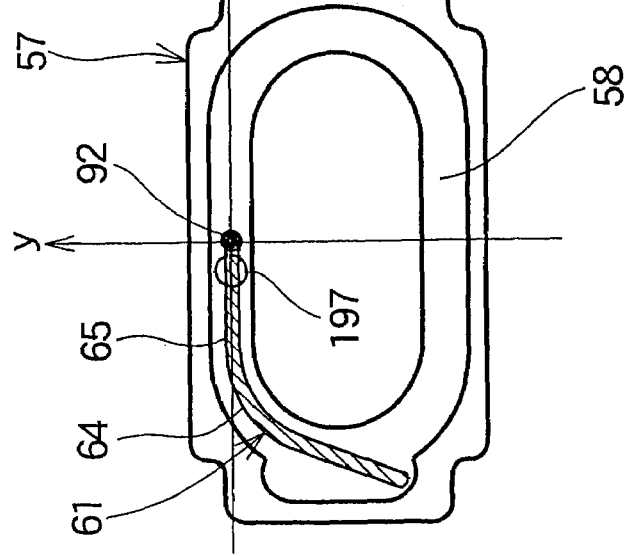

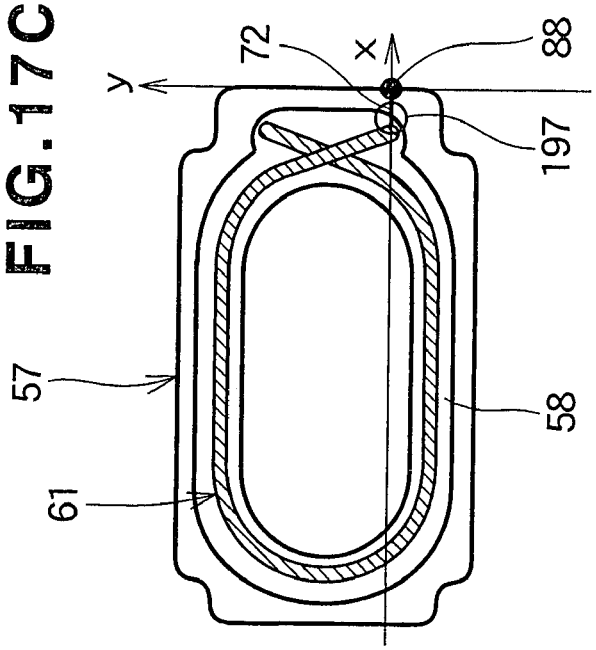
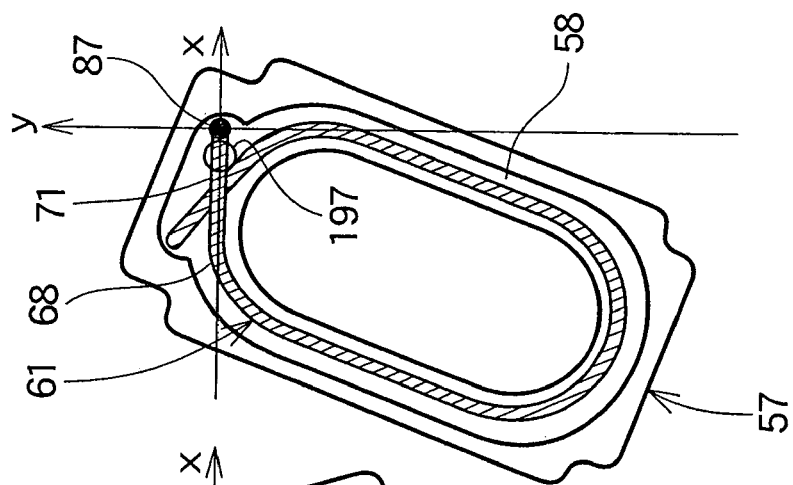
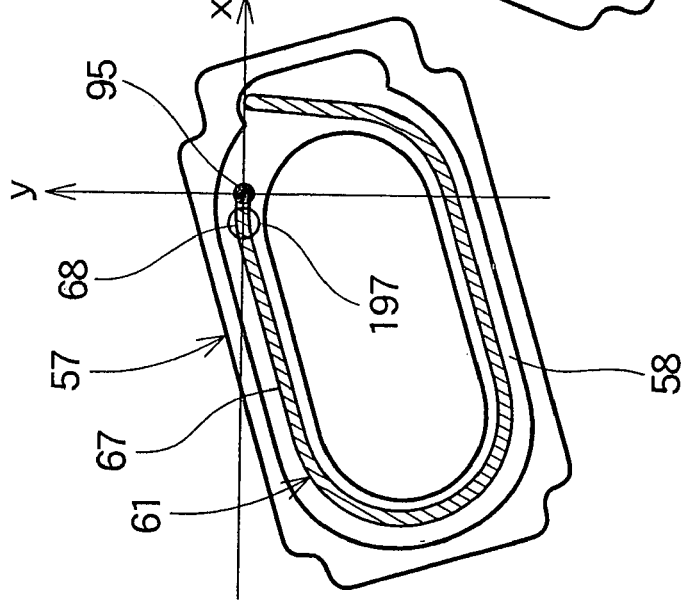

METHOD OF COATING FUEL CELL SEPARATOR WITH SEAL MATERIAL

TECHNICAL FIELD

The present invention generally relates to the manufacture of a fuel cell and, in particular, to a method for coating a sealant on a separator for a fuel cell in which sealability is improved by improving the sealant coating quality on the separator, and deterioration of the quality of the fuel cell is prevented.

BACKGROUND ART

A fuel cell is a cell which can obtain electricity in a process in which water is obtained by making hydrogen and oxygen react by utilizing a principle which is opposite of electrolysis of water. Generally, fuel gas is replaced with hydrogen, and air or an oxidizing agent gas is replaced with oxygen.

As such a fuel cell, for example; Japanese Patent Application Laid-Open (JP-A) No. 2000-123848 "Fuel Cell" is known. This fuel cell is shown by an exploded perspective view in FIG. 22.

As shown in FIG. 22, an anode side electrode 202 and a cathode side electrode 203 are disposed along an electrolytic film 201, and a unit fuel cell (cell module) 200 is structured by sandwiching these by a first separator 206 and a second separator 207 via gaskets 204, 205.

In detail, this is a structure in which a first flow path 208 which is a flow path for fuel gas is formed on a surface 206a of the first separator 206, and a second flow path 209 which is a flow path for an oxidizing agent gas is formed on a surface 207a of the second separator 207, and the fuel gas and the oxidizing agent gas respectively face the central electrolytic film 201.

Because the electric output which is obtained by one cell module shown in FIG. 22 is extremely small, by laminating a large number of such cell modules 200, the desired electric output is obtained. Accordingly, the first and second separators 206, 207 are called "separators" because the fuel gas and the oxidizing agent gas are separated so as not to leak to adjacent cells.

The first separator 206 has the flow path 208 for fuel gas on the surface 206a, and the second separator 207 has the flow path 209 for oxidizing agent gas on the surface 207a. However, it is necessary for gas to effectively contact the anode side electrode 202 and the cathode side electrode 203. Therefore, it is necessary for the flow paths 208, 209 to provide a large number of extremely shallow grooves.

Each of the first and second separators 206, 207, respectively, has a fuel gas supplying hole portion 210a and an oxidizing agent gas supplying hole portion 211a at one end portion thereof, and has a fuel gas discharging hole portion 210b and an oxidizing agent gas discharging hole portion 211b at the other end portion thereof. Further, each of the first and second separators 206, 207 has a cooling water supplying hole portion 212a for making cooling water pass through at one end portion thereof, and has a cooling water discharging hole portion 212b at the other end portion thereof.

The present inventor variously attempted to manufacture a cell module by sandwiching a membrane/electrode assembly formed from electrolytic films and electrodes by two separators, by coating on the separator a liquid sealant in place of the gaskets 204, 205 whose manufacturing requires much time and much cost. In this process, one problem arose. This problem will be described on the basis of FIGS. 23A and 23B which are schematic diagrams of the coating-start portion of the sealant.

As shown in FIG. 23A, when a sealant 222 starts to be coated on a separator 223 by moving a nozzle 221 in the direction of the outlined arrow while discharging the sealant 222 from the nozzle 221, because the adhesion between the separator 223 and a coating-start portion 224 of the sealant 222 is not sufficient, there are cases in which the distal end of the coating-start portion 224 turns up.

Further, as shown in FIG. 23B, because the nozzle moving velocity in the direction of the outlined arrow at the time of starting of coating of the sealant 222 is not appropriate, there are cases in which a missing portion 225 arises due to the coating-start portion 224 of the sealant 222 being cut off.

In this way, if the sealant coating quality of the coating-start portion 224 of the sealant 222 is reduced, the sealability deteriorates, and the sealant coating quality at the coated portion after the coating-start portion 224 of the sealant 222 is affected.

Yet another problem arose. This other problem will be described on the basis of FIGS. 24A through 24C in which the sealant is shown in cross-section.

As shown in (a) of FIG. 24A, the sealant 222 was coated on the separator 223. The sealant 222 has a height h1.

Next, as shown in (b) of FIG. 24A, an unillustrated membrane/electrode assembly and another separator 233 are laminated on the separator 223, and the sealant 222 is crushed until the height thereof becomes a height h2. The height h2 of the crushed sealant 222 is determined by the thickness of the electrolytic film and the electrode which are sandwiched between the separators 223, 223. In other words, because the electrolytic film and the electrode are between the separators 223, 223, the sealant 222 cannot be further crushed and extended. In the drawing, d1 shows the crushing margin of the sealant 222.

On the other hand, as shown in (a) of FIG. 24B, a sealant 235, whose height in cross-section is different from that of the sealant 222 in (a) of FIG. 24A, is coated on the separator 223. A height h3 of the sealant 235 is made greater than the height h1 of the sealant 222.

Next, as shown in (b) of FIG. 24B, the unillustrated membrane/electrode assembly and other separator 233 were laminated on the separator 223, and the sealant 235 was crushed until the height thereof became the same height as the height h2 of the sealant 222 in (b) of FIG. 24A. In this case, the crushing margin of the sealant 235 is d2.

In this way, given that the crushing margin of the sealant 235 is d2, the height h1 of the sealant 222 in (a) of FIG. 24A is smaller than the height h3 of the sealant 235 in (a) of FIG. 24B, and the crushing margin d1 is smaller than the crushing margin d2. As a result, at the sealant 222, the crushing pressure is insufficient, and it is difficult to obtain good sealability.

Here, in order to make the height of the sealant at the time of coating large, a sealant 237, as shown in (a) of FIG. 24C, in which the aspect ratio (the ratio between the height and the width) is made the same as the cross-section of the sealant 222 in (a) of FIG. 24A and the height is made the same as the height h3 of the sealant 235 in (a) of FIG. 24B, is used, and the sealant 237 is crushed as shown in (b) of FIG. 24C up to the height h2 which is the same as the height of the sealant 235 in (b) of FIG. 24B.

As can be understood from FIGS. 24B and 24C, the sealant 235 has a width w1, and the sealant 235 after being crushed has a width w2. On the other hand, a width w3 of the sealant 237 is greater than the width w1 of the sealant 235, and a width w4 of the sealant 237 after being crushed is greater than the width w2 of the sealant 235 after being crushed. If the width w4 of the sealant 237 after being crushed is too large in this way, there are cases in which the sealing quality is reduced due to the sealant 237 being forced out from a predetermined range between the separator 223 and the separator 233 which are laminated, or the output of the fuel cell is affected due to the sealant 237 adhering to the membrane/electrode assembly, and thereby deterioration of the quality of the fuel cell is brought about.

DISCLOSURE OF THE INVENTION

An object of the present invention is to improve sealability by improving the sealant coating quality at a coating-start portion of a sealant of a separator for a fuel cell, and to improve the sealability by making the height larger than the width of the coated sealant, and therefore, prevent deterioration of the quality of the fuel cell.

According to a first aspect of the present invention, there is provided a method for coating a sealant on a separator for a fuel cell, which comprises a step of preparing a separator having a gas flow path and a water flow path, and a sealant coating apparatus for coating a liquid sealant at a periphery of the gas flow path and the water flow path of the separator; a step of, at a coating-start portion of the sealant, making a nozzle portion provided at the sealant coating apparatus be nearer to the separator than at portions other than the coating-start portion; and a step of, at the coating-start portion of the sealant, moving the nozzle portion at a horizontal moving velocity which is slower than at the portions other than the coating-start portion.

By making the nozzle portion be near to the separator, the pressing force pressing the discharged sealant against the separator can be made large, and the sealant can be adhered to the separator. Accordingly, for example, turning-up of a distal end portion of the coating-start portion can be prevented. Further, by lowering the horizontal moving velocity of the nozzle portion, the sealant can be coated at a more uniform thickness, and for example, missing portions of the sealant can be prevented. In this way, by making the nozzle portion be near to the separator and lowering the horizontal moving velocity of the nozzle portion, the sealant coating quality at the coating-start portion of the sealant is improved, and the sealability can be improved.

Preferably, the step of making the nozzle portion be near to the separator includes a step of stopping the nozzle portion for a predetermined period of time from the start of discharging the sealant. By stopping the nozzle portion for a predetermined period of time from the start of discharging the sealant, the sealant which is discharged can be pressed against and adhered to the separator while taking time, and the coating quality of the sealant can be further improved, and the sealability can be further improved.

According to a second aspect of the present invention, there is provided a method for coating a sealant on a separator for a fuel cell, including a step of preparing a separator having a gas flow path and a water flow path, and a sealant coating apparatus for coating a liquid sealant at a periphery of the gas flow path and the water flow path; and a step of inclining the sealant coating apparatus at a predetermined angle with respect to a vertical line when the sealant is coated at the periphery of the gas flow path and the water flow path.

By coating the sealant in a state in which the sealant coating apparatus is inclined at a predetermined angle with respect to the vertical line, the height with respect to the width of the sealant can be made larger, and when the membrane/electrode assembly and another separator are laminated on the separator on which the sealant is coated, the crushing margin of the sealant can be made large, and the sealability can be improved. Further, the width of the sealant after the sealant is crushed can be suppressed, and flowing-out of the sealant from between the separators at the time of laminating and adhering of the sealant to the electrode can be eliminated, so that deterioration of the quality of the fuel cell can be prevented.

Preferably, the sealant coating step is executed by fixing the nozzle portion of the sealant coating apparatus and by moving the separator by a moving device. There is no need to additionally provide, at the sealant coating apparatus side, a structure for moving the sealant coating apparatus, and the sealant coating apparatus side can be made to be a simple structure.

BRIEF DESCRIPTION OF THE DRAWINGS

FIGS. 7A through 7G are operational views for explanation of movement of a nozzle portion of the sealant coating gun and a coating operation of the sealant according to the present invention;

FIG. 14A is an enlarged view of main portions of the sealant coating gun and a monitoring camera, and FIG. 14B is a sectional view taken along line B-B of FIG. 14A;

FIGS. 15A through 15C are operational views sequentially showing initial processes of another method for coating a sealant on a separator according to the present invention;

FIGS. 16A through 16C are operational views sequentially showing intermediate processes of the another method for coating a sealant on a separator according to the present invention;

FIGS. 17A through 17C are operational views sequentially showing latter processes of the another method for coating a sealant on a separator according to the present invention;

BEST MODE FOR CARRYING OUT THE INVENTION

Figure 1:
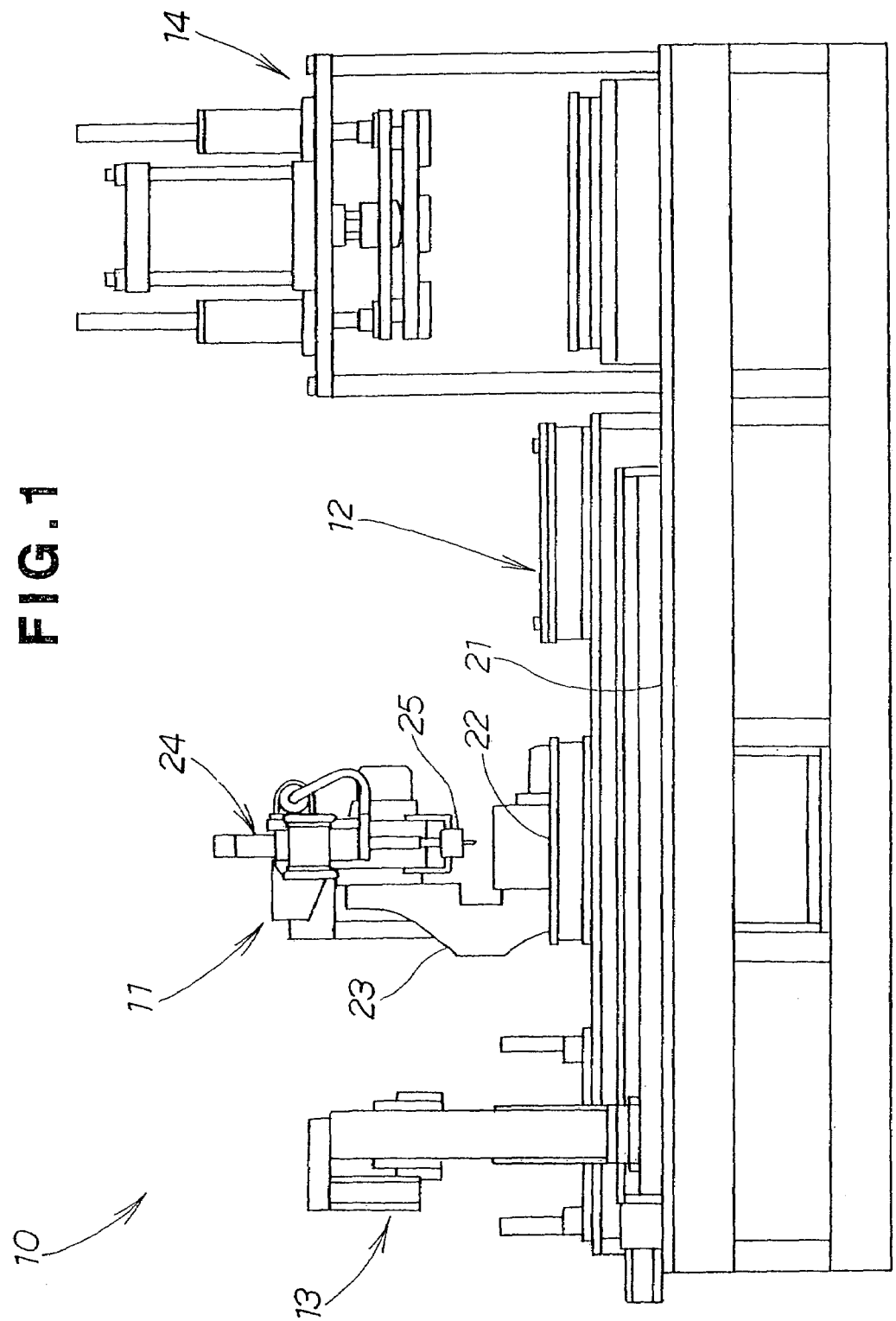
FIG. 1 is a front view of a sealant coating laminating apparatus of a separator for a fuel cell according to the present invention.

As shown in FIG. 1, a seal coating laminating apparatus 10 has a sealant coating station 11 which coats sealant on a separator and a laminating station 12 which laminates membrane electrode assembly on the separator on which the sealant was coated. Note that reference numeral 13 denotes an introducing station introducing the separator into the sealant coating station 11, and reference numeral 14 is a trimming station trimming the membrane electrode assembly.

The membrane electrode assembly is structured such that an anode side electrode and a cathode side electrode formed from carbon papers are respectively adhered to the both sides of a high polymer electrolytic film formed from a high molecular compound.

Figure 2:
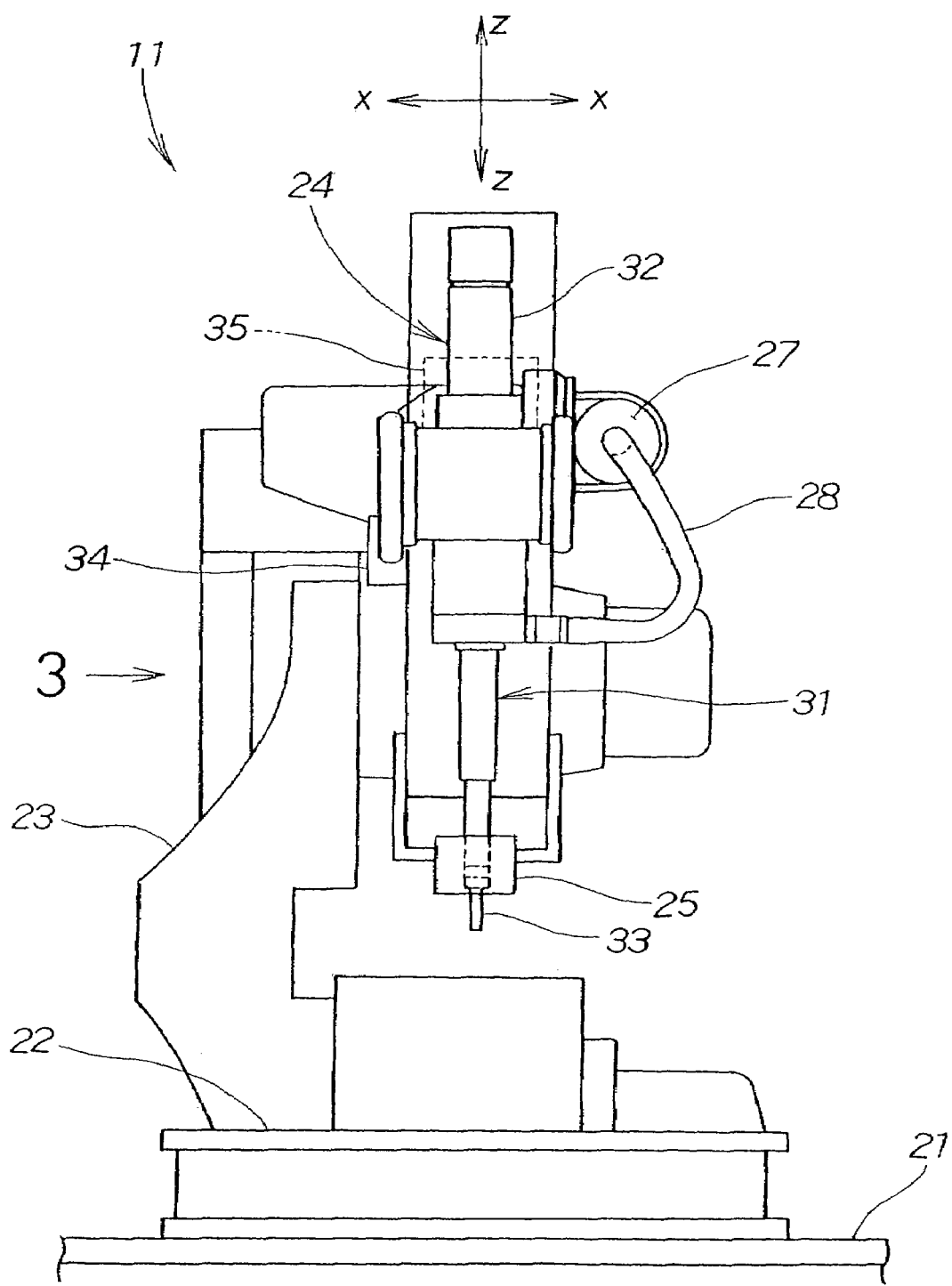
FIG. 2 is an enlarged front view of main portions of a sealant coating station according to the present invention.

As shown in FIG. 2, the sealant coating station 11 is formed from a separator placement platform 22 attached to a base portion 21, an arm portion 23 attached the base portion 21, a sealant coating gun 24 serving as a sealant coating apparatus attached the arm portion 23, and a non-contact type sensor 25 disposed so as to be near to the distal end of the sealant coating gun 24.

The sealant coating gun 24 is formed from a sealant cartridge 27 which houses sealant and which is exchangeable, a sealant supplying hose 28 attached the sealant cartridge 27, a sealant extruding portion 31 to which the distal end of the sealant supplying hose 28 is connected, an electric motor 32 driving the sealant extruding portion 31, and a nozzle portion 33 attached to the distal end of the sealant extruding portion 31 for discharging sealant. Note that reference numeral 34 denotes a left-right movement device which moves the sealant coating gun 24 in the left-right direction (the x-x direction), and reference numeral 35 denotes a vertical movement device which moves the sealant coating gun 24 in the vertical direction (the z-z direction).

The non-contact type sensor 25 is a sensor which senses, in a state of non-contact, the sealant, which was previously coated in the midst of coating the sealant on the separator by irradiating, for example, a laser onto a separator surface which is substantially below the nozzle portion 33. On the basis of a signal from the non-contact type sensor 25, a control apparatus which will be described later drives the left-right movement device 34, the vertical movement device 35 and a front-back movement device which will be described later and controls the horizontal movement and the raising-lowering of the sealant coating gun 24.

As will be described later, the sealant extruding portion 31 of the sealant coating gun 24 is structured such that a screw at which a spiral groove is provided is inserted in a cylinder, and sucks the sealant in the sealant cartridge 27 via the sealant supplying hose 28 by rotating the screw by the electric motor 32, and extrudes the sealant between the inner wall of the cylinder and the groove of the screw, and discharges the sealant from the nozzle portion 33. Further, as will be described later, the sealant extruding portion 31 pushes the sealant up between the inner wall of the cylinder and the groove of the screw, and sucks the sealant from the nozzle portion 33, by rotating the screw in a direction opposite to the above direction.

Figure 3:
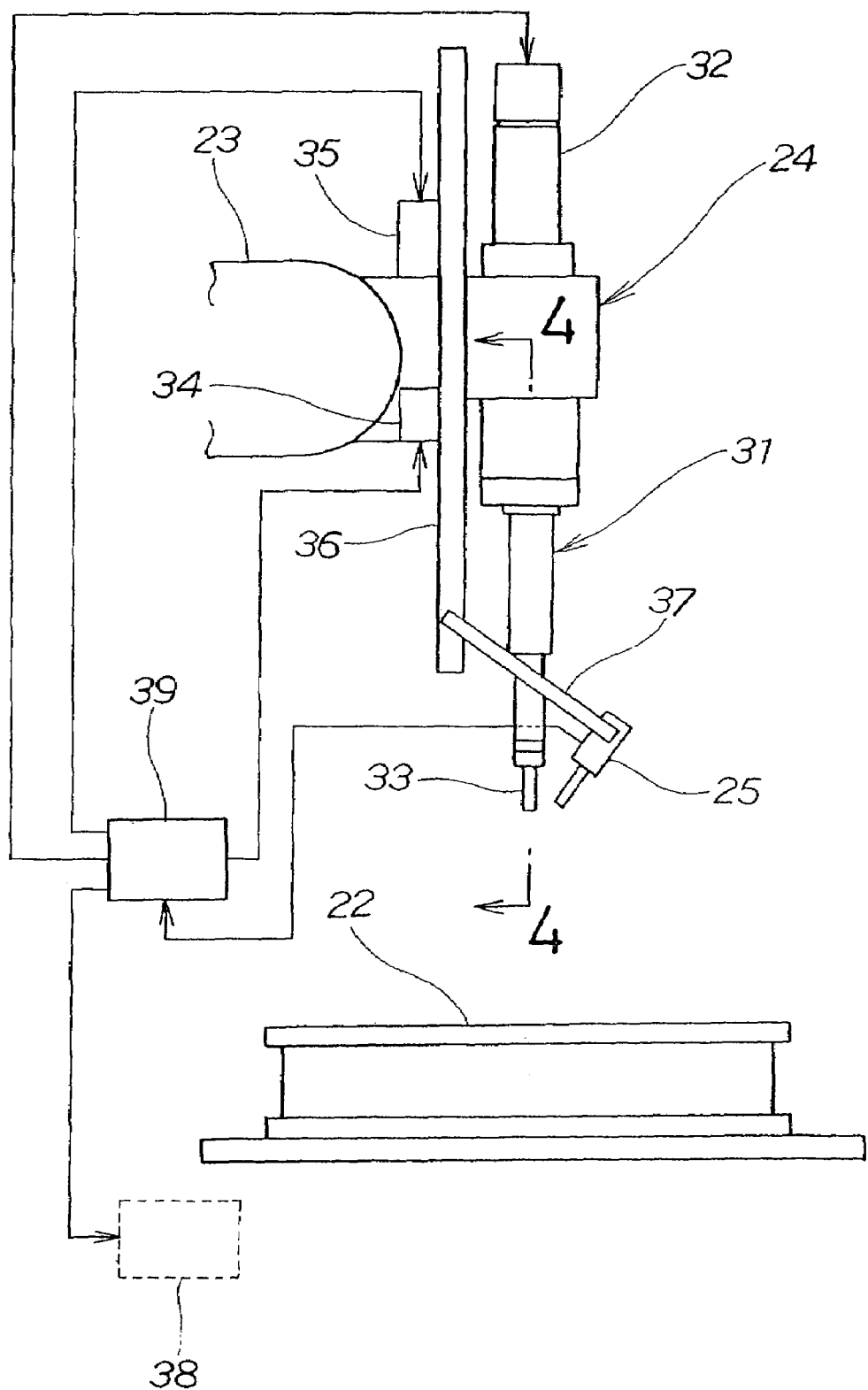
FIG. 3 is a side view of the sealant coating station as seen from arrow 3 of FIG. 2.

FIG. 3 shows that a backing-plate 36 is attached to the rear portion of the sealant coating gun 24, and stays 37, 37 (the stay at the inner side is not illustrated) are extended in an oblique direction from the lower end of the backing-plate 36, and the non-contact type sensor 25 is attached to the distal ends of these stays 37, 37. Note that reference numeral 38 denotes a front-back movement device which is provided for moving the sealant coating gun 24 in the front-back direction (the y-y direction), and reference numeral 39 denotes a control device which controls the driving of the electric motor 32, the left-right movement device 34, and the vertical movement device 35.

The distal end of the non-contact type sensor 25 is directed downward of the nozzle portion 31.

Figure 4:
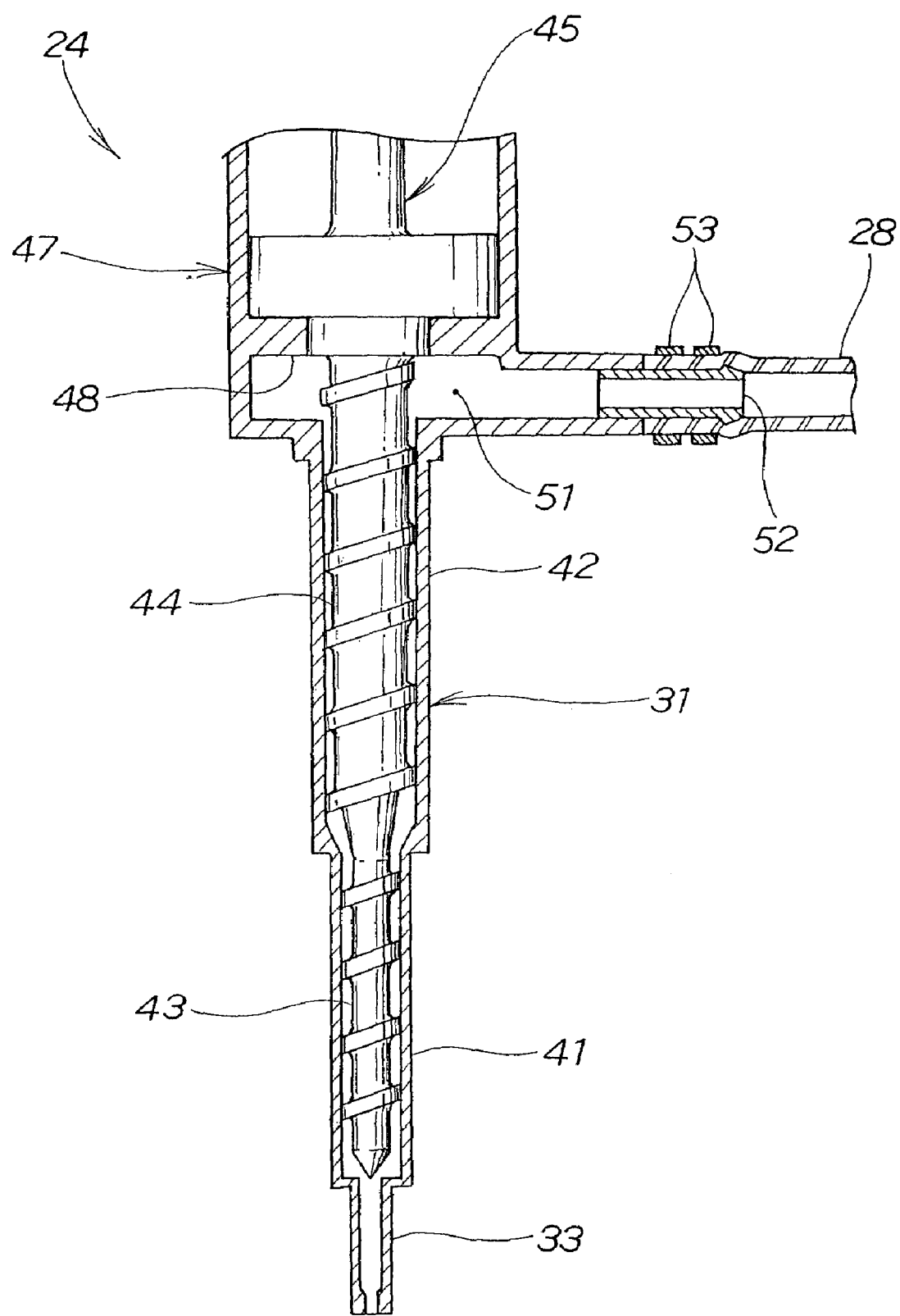
FIG. 4 is a sectional view taken along line 4-4 in FIG. 3.

In FIG. 4, a first cylinder portion 41 and a second cylinder portion 42 are provided at the sealant extruding portion 31 of the sealant coating gun 24. A sealant extruding shaft 45, in which a first screw 43 and a second screw 44 are respectively inserted in these first cylinder portion 41 and second cylinder portion 42, is connected to an output shaft of the electric motor 32 (refer to FIG. 3).

Here, reference numeral 47 denotes a case portion which is integrally formed with the second cylinder portion 42, and reference numeral 48 denotes a bearing portion provided at the case portion 47 for supporting the sealant extruding shaft 45, and reference numeral 51 denotes a sealant introducing chamber formed at the case portion 47 for communicating with the sealant supplying hose 28, and reference numeral 52 denotes a joint, and reference numerals 53, 53 denote hose bands.

Figure 5:
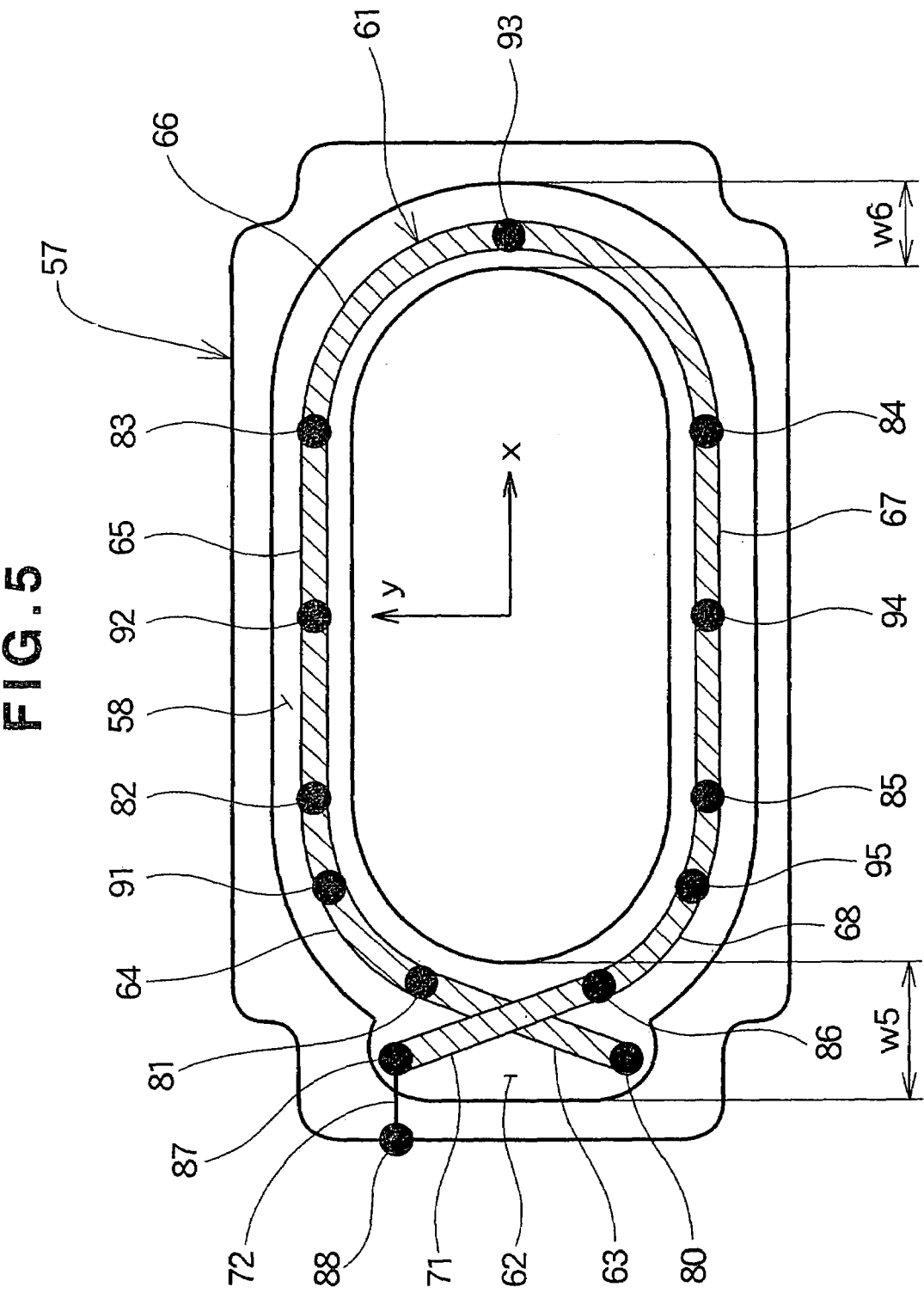
FIG. 5 is a plan view of the separator according to the present invention.

FIG. 5 shows a state in which a gas flow path and a water flow path (which are not shown) are formed at the separator 57, and a sealant coating groove 58 is provided at the periphery of these gas flow path and water flow path, and the sealant 61 is coated in the sealant coating groove 58.

The sealant coating groove 58 is a circular groove in plan view which has an extension portion 62 whose width is greater than other portions. Assuming that a groove width of the extension portion 62 is w5 and a groove width of the portions other than the extension portion 62 is w6, w5>w6 is obtained.

The sealant 61 is coated as a straight shaped coating-start portion 63 at the extension portion 62 of the seal groove 58, and is coated in order from the coating-start portion 63, as a first curved portion 64, a first straight portion 65, a second curved portion 66, a second straight portion 67, and a third curved portion 68, and is coated as a straight shaped coating-end portion 71 following the third curved portion 68 at the extension portion 62.

Here, reference numeral 72 denotes a moving route along which the sealant coating gun 24 horizontally moves without coating the sealant 61, and reference numerals 80 through 88 denote imaginary points provided on the sealant coating groove 58 in FIG. 5 for being a starting point or an ending point of movement of the sealant coating gun 24 at the time of coating the respective portions of the sealant 61. Reference numeral 91 denotes a point on the first curved portion 64, reference numeral 92 denotes a point of the first straight portion 65, reference numeral 93 denotes a point on the second curved portion 66, reference numeral 94 denotes a point on the second straight portion 67, and reference numeral 95 denotes a point on the third curved portion 68.

Next, the method for coating the sealant will be described.

Figure 6:
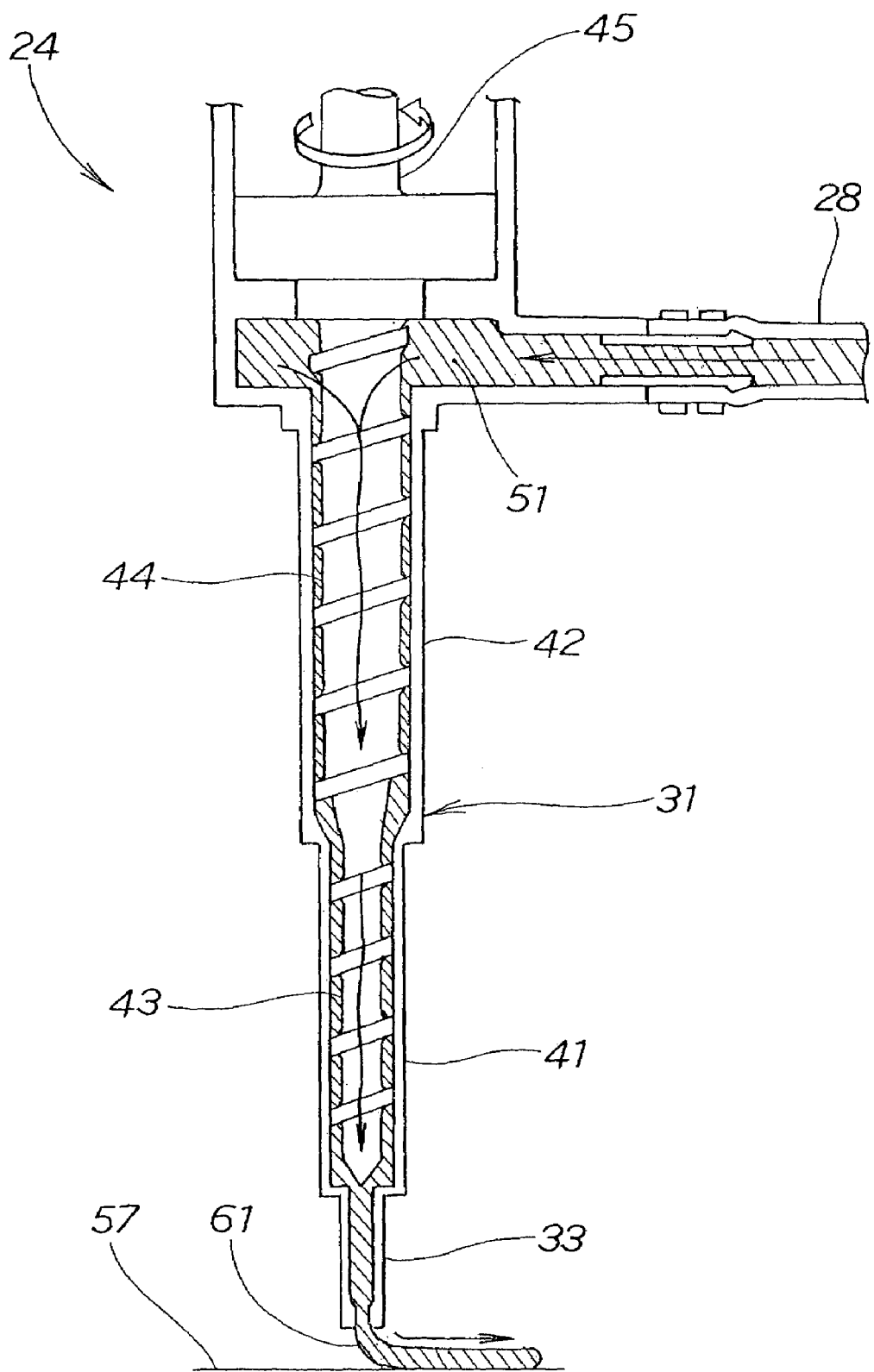
FIG. 6 is an operational view showing a discharging operation of a sealant by a sealant coating gun according to the present invention.

As shown in FIG. 6, in order to start coating of the sealant 61, the sealant extruding shaft 45 is rotated in the direction of the outlined arrow by operating the electric motor. The rotating direction of the electric motor and the sealant extruding shaft 45 here is the forward direction (is forward rotation).

In accordance therewith, the sealant 61 sucked into the sealant introduction room 51 via the sealant supplying hose 28 from the sealant cartridge is, as shown by the arrows, extruded downward from between the first cylinder 41 and the groove of the first screw 43, and between the second cylinder 42 and the groove of the second screw 44, and is discharged from the nozzle portion 33 to the exterior, to be coated on the separator 57.

As shown in FIG. 7A, the distal end of the nozzle portion 33 is disposed so as to be separated by a predetermined distance L1 from the separator 57.

In FIG. 7B, the nozzle portion 33 is made to descend by a predetermined distance L2 from the position of FIG. 7A, and coating of the sealant is started.

In FIG. 7C, the nozzle portion 33 is once stopped until a predetermined period of time t1 has elapsed from the start of coating of the sealant 61, and the sealant 61 is sufficiently adhered to the separator 57.

Further, after the aforementioned predetermined period of time t1 has elapsed, the nozzle portion 33 is made to ascend up to the height of FIG. 7A while being moved at a horizontal moving velocity v1.

In FIG. 7D, when the nozzle portion 33 has ascended up to the height shown in FIG. 7A, the sealant 61 is coated on the separator 57 while horizontally moving the nozzle portion 33 with the moving velocity being increased to a horizontal moving velocity v2 (v2 >v1). At this time, a laser 74 is irradiated onto the separator 57 from the non-contact type sensor.

In FIG. 7E, when the laser 74 reaches the coating-start portion 63 of the sealant 61 and the non-contact type sensor senses the coating-start portion 63, in FIG. 7F, the sealant coating gun horizontally moves at a horizontal moving velocity v3 (v3 <v2) while carrying out a sealant sucking operation (details of which will be described later). Therefore, the discharging amount of the sealant 61 from the nozzle portion 33 is reduced, and as shown in FIG. 7G, discharging of the sealant 61 from the nozzle portion 33 is stopped in a short time. When the nozzle portion 33 moves up to the point 87 shown in FIG. 5, the electric motor is stopped, the sealant sucking operation of the sealant coating gun is completed and the coating of the sealant is completed. Then, the nozzle portion 33 is moved from the point 87 to the point 88 at the horizontal moving velocity v3, and the coating process of the sealant 61 on the separator 57 is completed.

Figure 8:
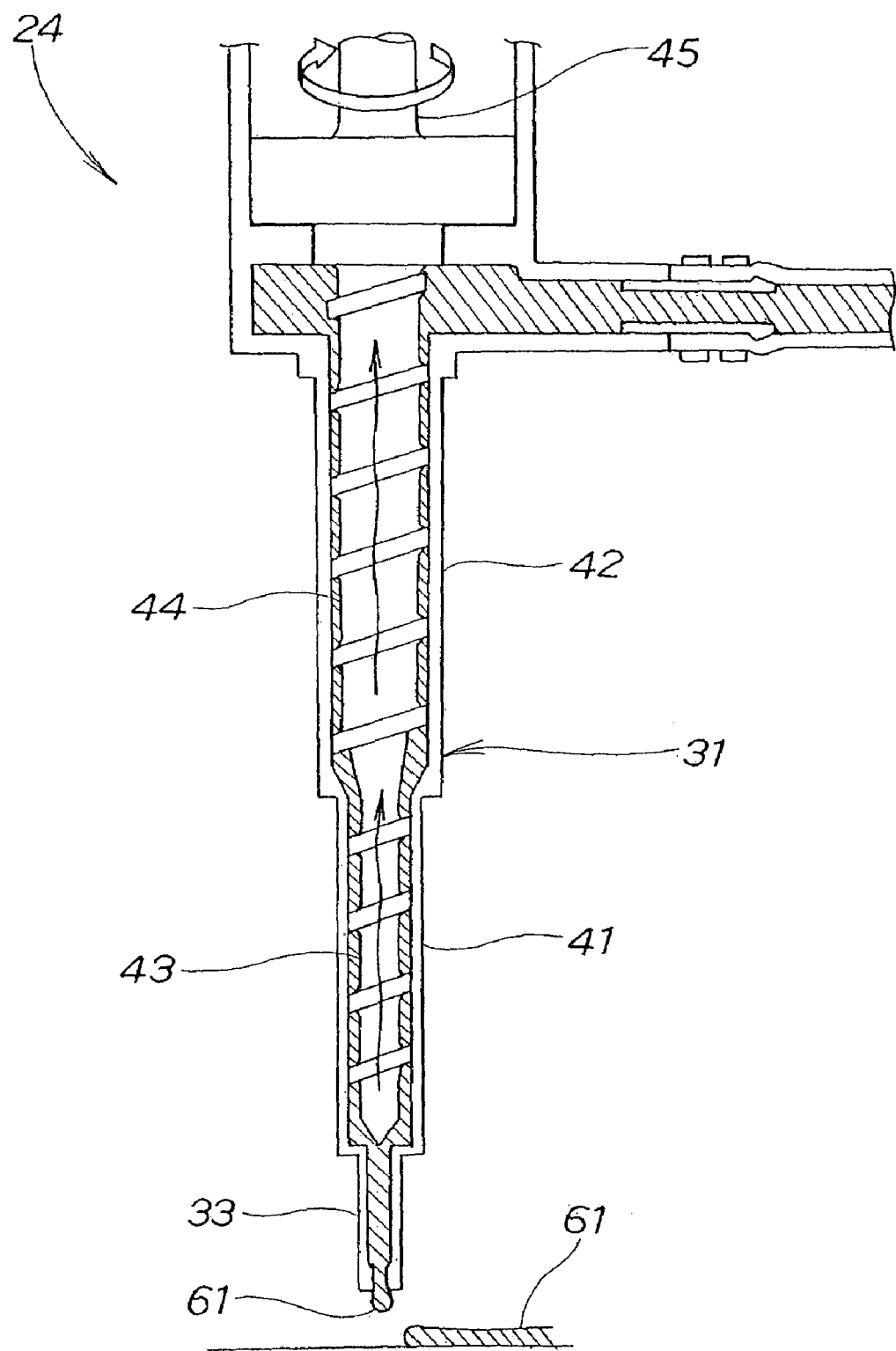
FIG. 8 is an operational view showing a sucking operation of a sealant by the sealant coating gun according to the present invention.

In FIG. 7E, when the non-contact type sensor senses the coating-start portion 63 of the sealant 61, the control device rotates the electric motor in a direction opposite to the rotating direction shown in FIG. 6 on the basis of the sensed signal, and the sealant extruding shaft 45 is rotated in the direction of the outlined arrow as shown in FIG. 8. Namely, the rotating direction of the electric motor and the sealant extruding shaft 45 is the inverse direction (is inverse rotation).

In accordance therewith, the sealant 61 between the first cylinder portion 41 and the groove of the first screw 43 and the sealant 61 between the second cylinder portion 42 and the groove of the second screw 44 are moved upward as shown by the arrows, and the sealant 61 in the nozzle portion 33 is sucked.

Accordingly, the discharged amount of the sealant 61 from the nozzle portion 33 is reduced, and the discharging of the sealant 61 from the nozzle portion 33 will stop in a short time.

Figure 9:
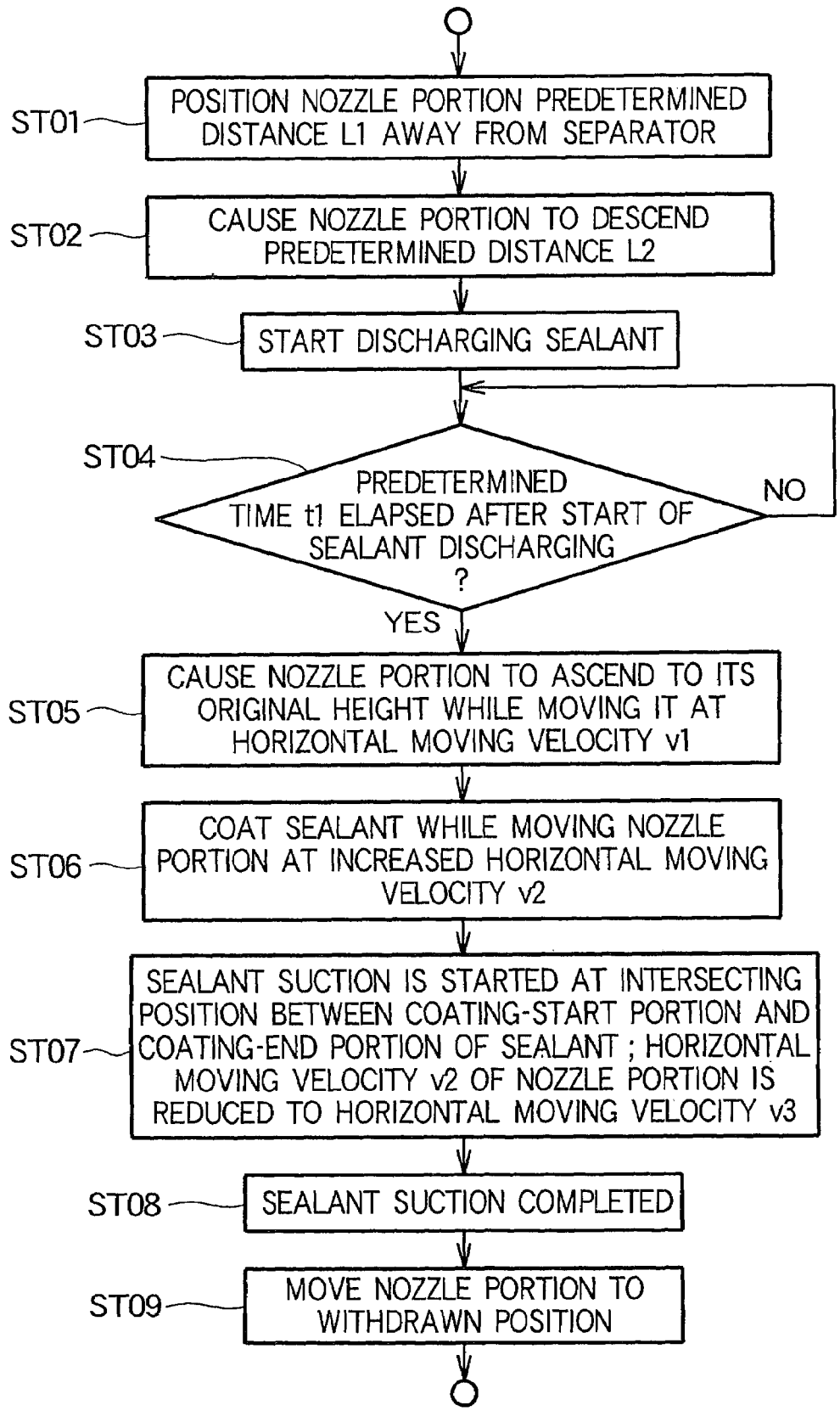
FIG. 9 is a flowchart of a method for coating a sealant according to the present invention.

In FIG. 9, a flowchart of the method for coating a sealant according to the present invention is shown, and the method for coating a sealant described in FIG. 7 will be described again. Note that STxx denotes step numbers.

ST01 . . . The nozzle portion of the sealant coating gun is disposed so as to be separated from the separator by a predetermined distance L1.

ST02 . . . The nozzle portion is made to descend by a predetermined distance L2.

ST03 . . . Discharging of the sealant from the nozzle portion is started in a state in which the nozzle portion is stopped, and coating of the sealant on the separator is started.

ST04 . . . After starting of discharging of the sealant, it is judged whether a predetermined period of time t1 has elapsed or not. When the predetermined period of time t1 has not elapsed (NO), ST04 is again executed. When the predetermined period of time t1 has elapsed (YES), the routine proceeds to ST05.

ST05 . . . The nozzle portion is made to ascend up to the original height while being moved at the horizontal moving velocity v1.

ST06 . . . The sealant is coated while moving the nozzle portion with the moving velocity being increased to the horizontal moving velocity v2.

ST07 . . . The electric motor is inversely rotated at an intersection position between the coating-start portion and the coating-end portion of the sealant, and the suction of the sealant is started. At the same time, the horizontal moving velocity v2 of the nozzle portion is reduced to the horizontal moving velocity v3.

ST08 . . . Suction of the sealant is completed, and coating of the sealant is completed.

ST09 . . . The nozzle portion is moved up to a withdrawn position.

Here, coating of the sealant on the separator is completed.

Figure 10:
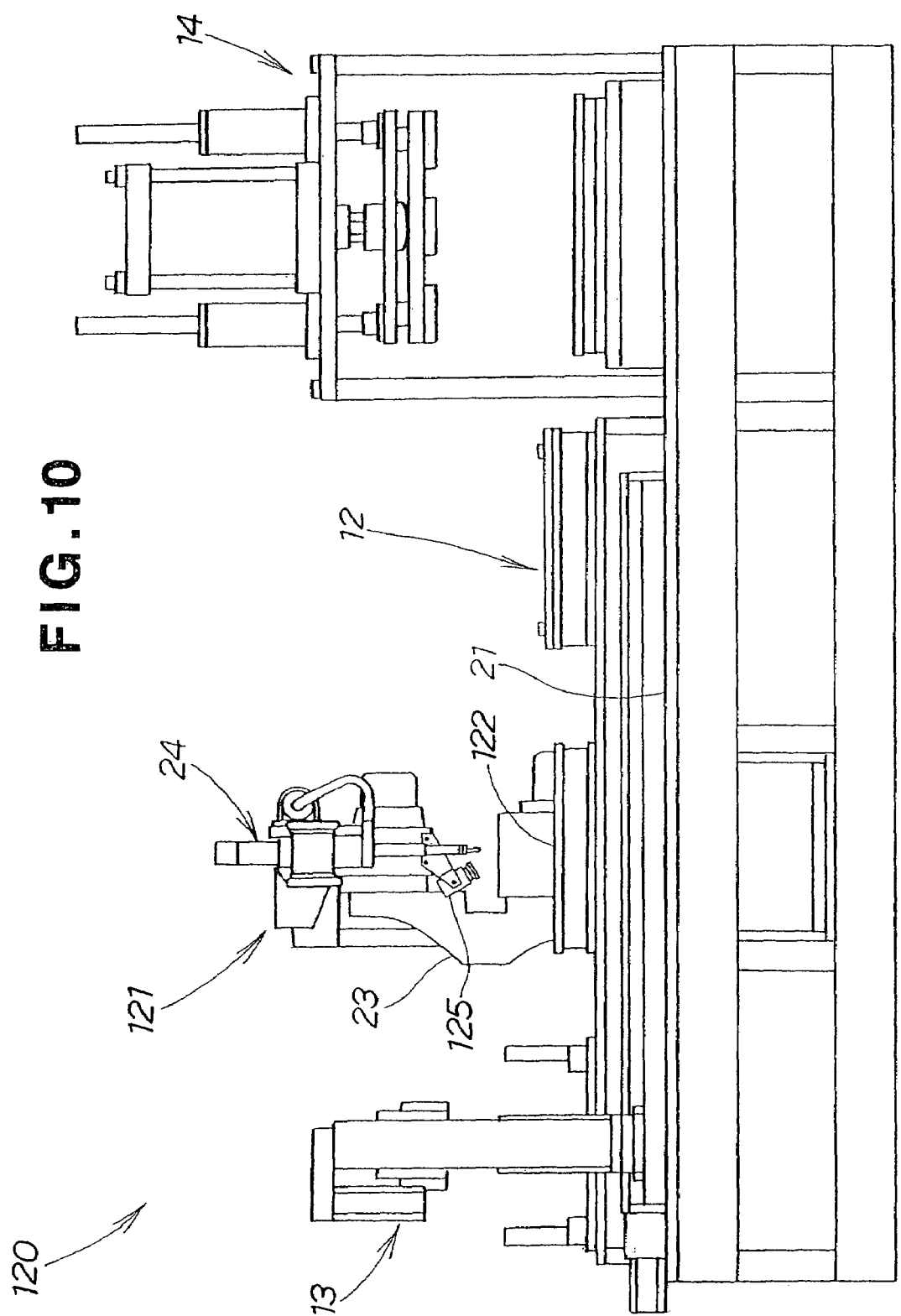
FIG. 10 is a front view of another sealant coating laminating apparatus of a separator for a fuel cell according to the present invention.

As shown in FIG. 10, a sealant coating laminating apparatus 120 has a sealant coating station 121, which coats a sealant on a separator, and the aforementioned laminating station 12. The sealant coating station 121 is structured such that, when a sealant is coated on the separator, the sealant coating gun 24 is inclined at a predetermined angle with respect to a vertical line, and the separator is moved without moving the sealant coating gun 24.

Figure 11:
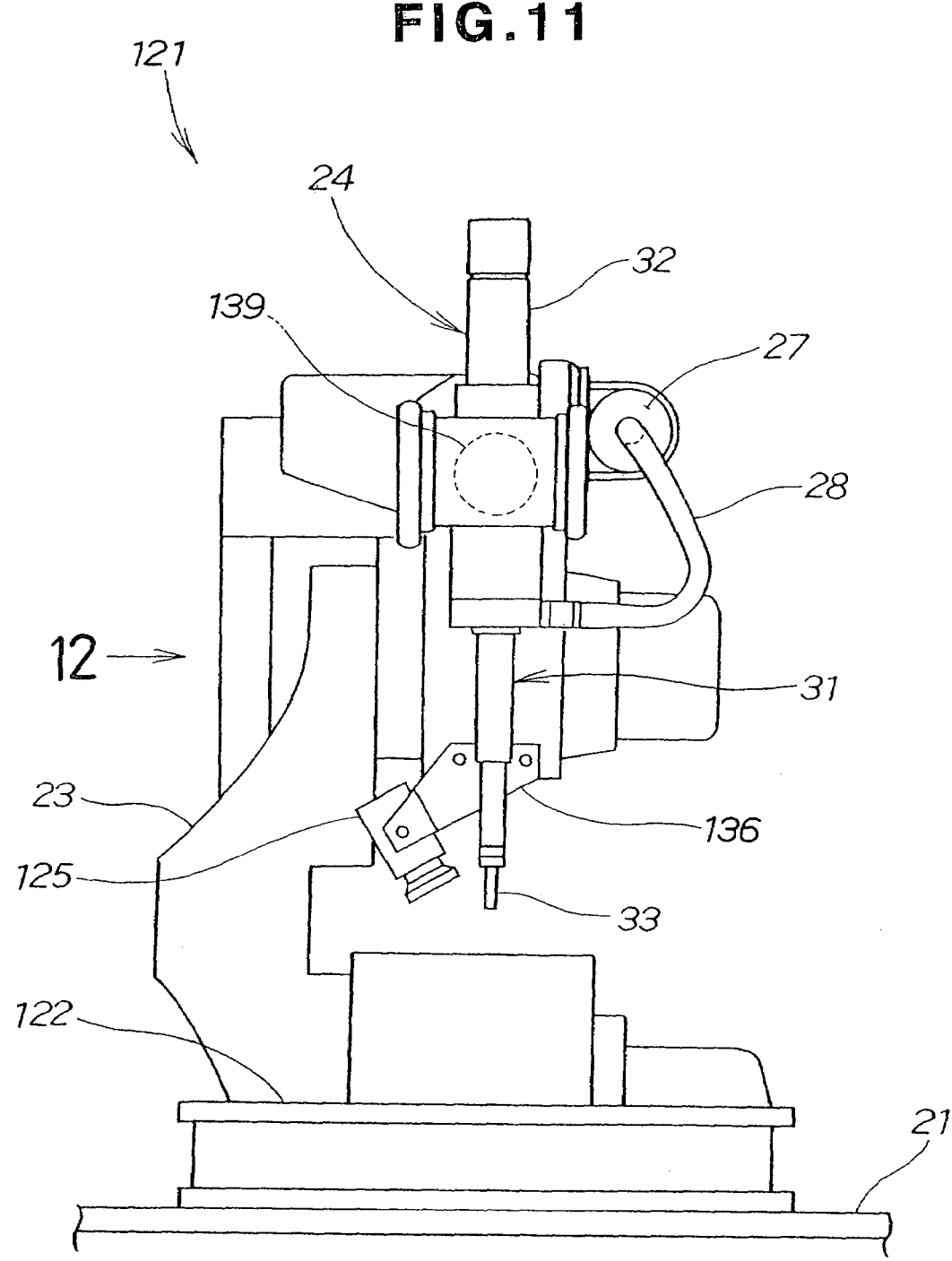
FIG. 11 is an enlarged front view of main portions of another sealant coating station according to the present invention.

As shown in FIG. 11, the sealant coating station 121 is formed from a separator placement table 122 serving as a movement device attached to the base portion 21, the arm portion 23, the sealant coating gun 24, and a monitoring camera 125 disposed so as to be near to the distal end of the sealant coating gun 24.

The monitoring camera 125 is set so as to make the vicinity below the nozzle portion 33 be within the visual field thereof, and is for monitoring the coating situation of the sealant which was already coated, and in particular, the outside dimension of the sealant in the midst of coating the sealant on the separator. As a result of the monitoring, when the outside dimension of the sealant deviates from a predetermined range, the unillustrated control device stops the sealant coating and driving of the separator placement table 122 on the basis of the signal from the monitoring camera 125.

The direction of the monitoring camera 125 is fixed so as to be always in a given direction, and is set so as to be finely adjusted as needed. However, it is not limited thereto, and a bracket 136 which will be described later and the monitoring camera 125 may be connected by a universal joint such as a ball joint or the like, and the direction of the monitoring camera 125 may be able to be changed by a driving motor attached to the bracket 136.

In this case, the unillustrated control device controls operation of the above-described driving motor on the basis of the signal from the monitoring camera 125 such that the sealant is within the visual field of the monitoring camera 125.

Figure 12:
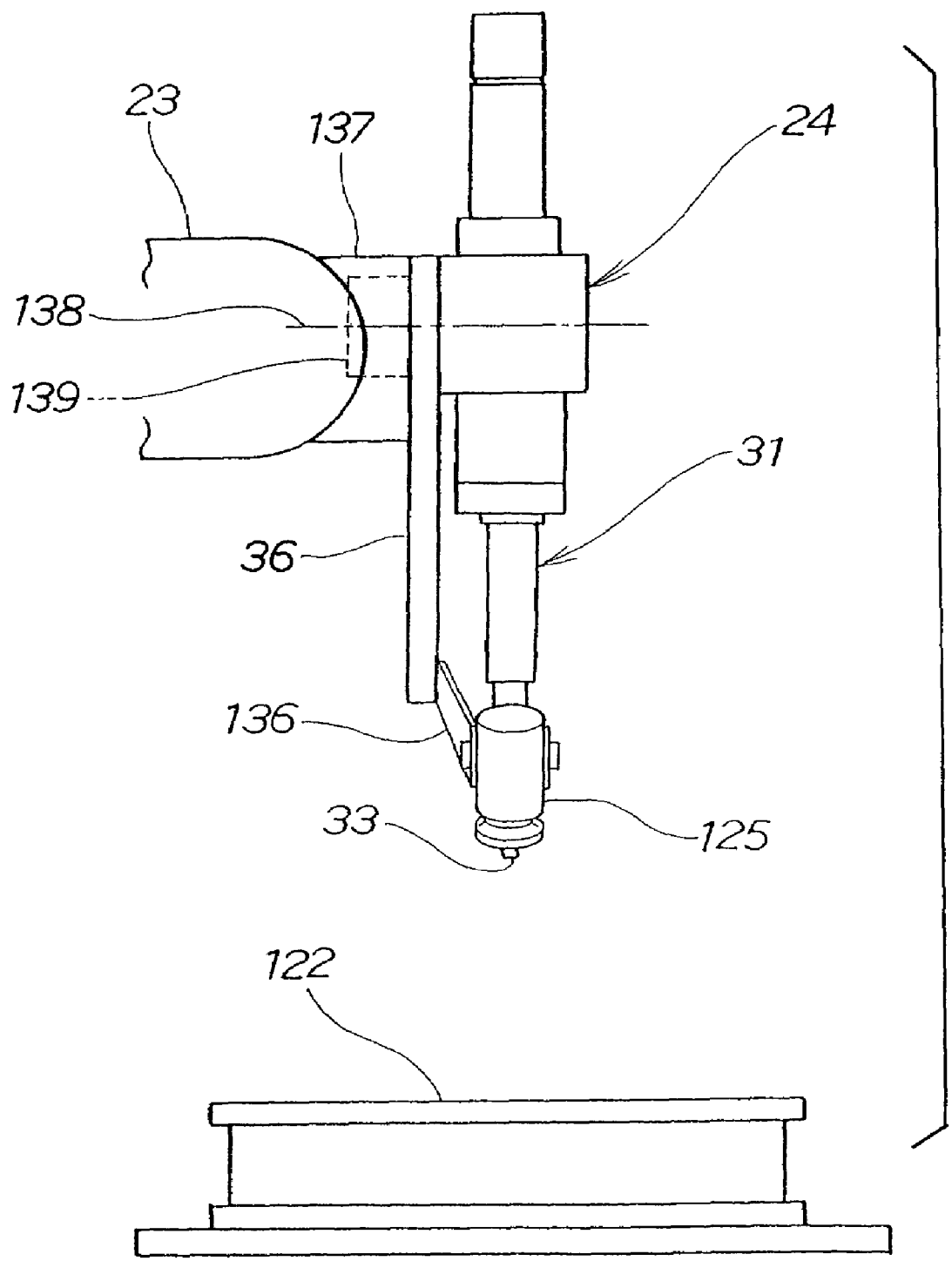
FIG. 12 is a side view of the sealant coating station as seen from arrow 12 of FIG. 11.

FIG. 12 shows that the backing-plate 36 is attached to the rear portion of the sealant coating gun 24, the bracket 136 is extended from the lower end of the backing-plate 36, the monitoring camera 125 is attached to the distal end of the bracket 136, and the monitoring camera 125 is disposed ahead of the nozzle portion 33 of the sealant coating gun 24 (in FIG. 11, the monitoring camera 125 is disposed at the left side when looking toward the nozzle portion 33).

Here, reference numeral 137 denotes a gun supporting portion in which one end thereof is attached to the arm portion 23 and the backing-plate 36 is attached to the other end so as to freely swing around a swing shaft 138, and reference numeral 139 denotes an inclination device for inclining the sealant coating gun 24 around the swing shaft 138.

Figure 13:
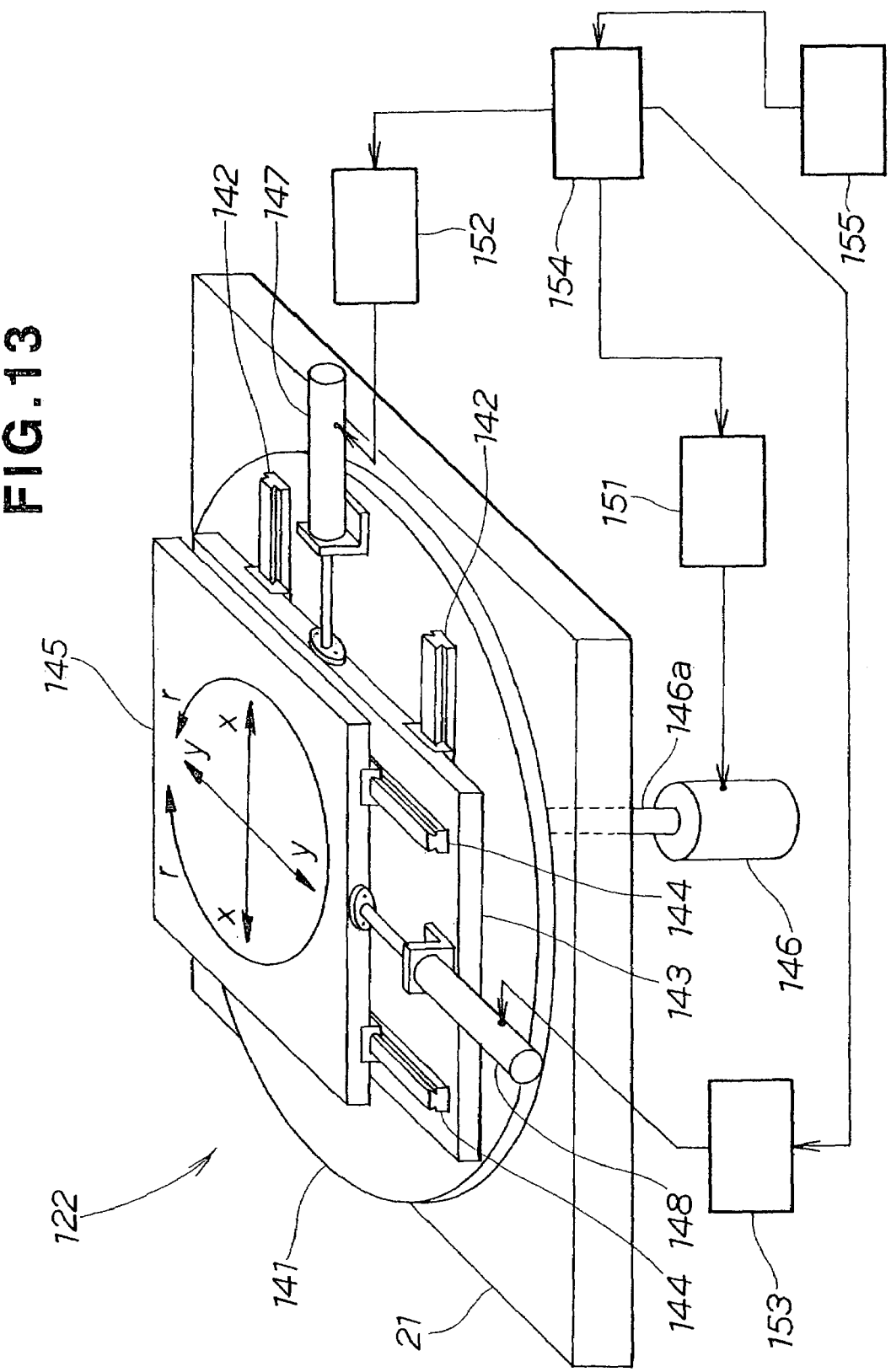
FIG. 13 is a perspective view of a separator placement table according to the present invention.

As shown in FIG. 13, the separator placement table 122 is formed from a turntable 141 attached to the base portion 21 so as to be pivotable, a first slide plate 143 attached to the turntable 141 via rails 142, 142 so as to be slidable, a second slide plate 145 attached to the first slide plate 143 via rails 144, 144 so as to be slidable, an electric motor 146 rotating the turntable 141, a first cylinder 147 attached to the turntable 141 for moving the first slide plate 143, a second cylinder 148 attached to the first slide plate 143 for moving the second slide plate 145, an electric motor driving device 151 driving the electric motor 146, a first cylinder driving device 152 driving the first cylinder 147, a second cylinder driving device 153 driving the second cylinder 148, a control device 154 controlling the driving of the electric motor driving device 151 and the first and second cylinder driving devices 152, 153, and an inputting device 155 for inputting, to the control device 154, data of the movement amount and the moving velocities of the first and second slide plates 143, 145 and the rotation angle and the rotation angle velocity of the turntable 141.

Namely, the separator placement table 122 is structured such that the second slide plate 145 can be moved in the x-x direction and the y-y direction which are shown by the arrows, and can be rotated in the r-r direction.

The method for coating a sealant on a separator by the sealant coating gun 24 described above will be described next.

Figure 14A:
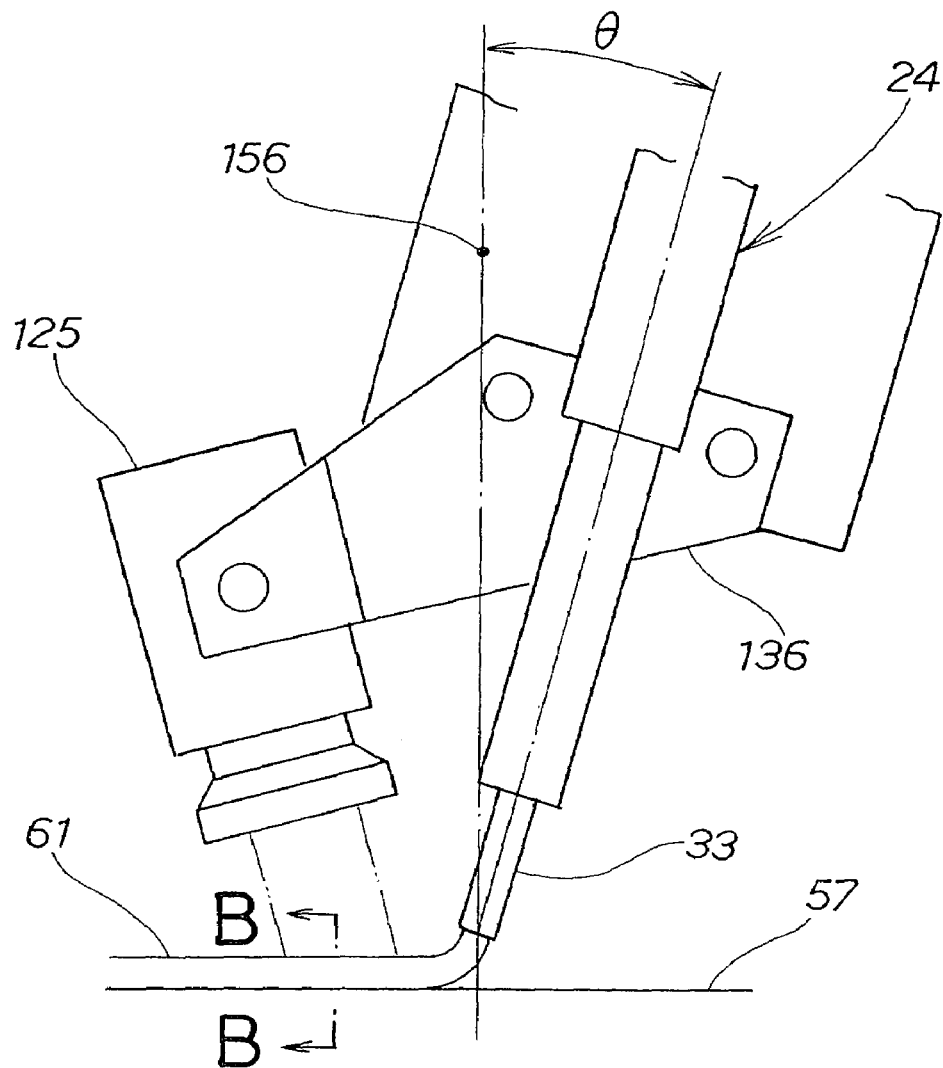
FIGS. 14A and 14B are operational views for explanation of the sealant coating procedures by the sealant coating gun according to the present invention, where

As shown in FIG. 14A, first, the aforementioned inclination device 139 (refer to FIG. 11) is operated, and the sealant coating gun 24 is inclined by a predetermined angle θ with respect to a vertical line 156. At this time, the monitoring camera 125 is integrally inclined accompanying the inclination of the sealant coating gun 24.

The vertical line 156 herein is a line passing through an output shaft 146a of the electric motor 146 shown in FIG. 13.

In this state, while the second slide plate 145 of the separator placement table 122 shown in FIG. 13 is made to carry out movement in the x direction, movement in the y direction, and rotation in the r direction as needed, the sealant 61 is discharged from the nozzle portion 33 of the sealant coating gun 24, and the sealant 61 is coated in the separator 57 and the sealant coating groove 58 (refer to FIG. 5) which will be described in detail later.

In the sealant coating gun 24 described above, the upper portion side of the sealant coating gun 24 is inclined in a direction (the right side of the drawing) opposite to the moving direction (the left side of the drawing) of the separator 57.

Figure 14B:
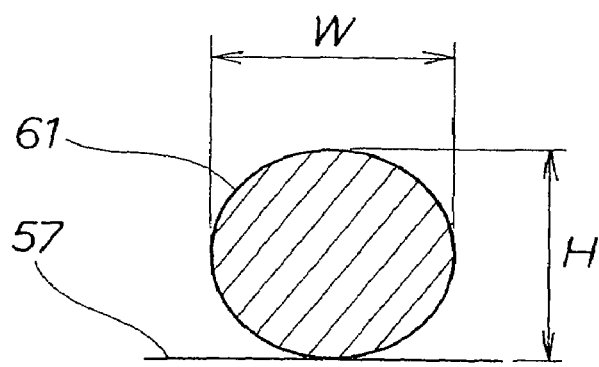

FIG. 14B shows the outside dimension of the sealant 61 coated on the separator 57.

H is the height of the sealant 61, and W is the width of the sealant 61, and given that the sectional shape of the sealant 61 is the sectional shape of a blade, the height H of the sealant 61 corresponds to the blade height, and the width of the sealant 61 corresponds to a chord length.

At this time, a ratio H/W between the blade height and the chord length is called the aspect ratio.

In the present invention, as will be described later, the angle of inclination θ of the sealant coating gun 24 shown in FIG. 14A is set such that the above-described aspect ratio H/W is within a predetermined value range.

Another method for coating a sealant on the separator described above will be described next.

In FIGS. 15A through 15C, the initial process of the another method for coating a sealant on a separator will be sequentially described by using FIG. 5 again. However, reference numeral 72 denotes a locus of the nozzle portion 33 (refer to FIG. 11) of the sealant coating gun when the separator 57 which is in a state in which the sealant 61 is not coated is moved, and reference numerals 80 through 88 denote imaginary points which are provided on the sealant coating groove 58 in FIG. 5 for being a starting point or an ending point of movement in the x direction and movement in the y direction and rotation at the second slide plate 145 of the separator placement table 122 shown in FIG. 13 when the sealant 61 is coated (these points are stored as x and y coordinates in a memory of the control device 154 shown in FIG. 13 when using a rectangular coordinate which is formed from the x axis and the y axis shown in the drawing). Note that, here, the origin of the rectangular coordinate formed by the x axis and the y axis is provided directly beneath the distal end of the nozzle portion of the sealant coating gun. The origin coincides with the origin of the rectangular coordinate shown in FIG. 5.

From the state in which the separator 57 (refer to FIG. 5) is positioned at the second slide plate 145 of the separator placement table 122 shown in FIG. 13, FIG. 15A shows that the second slide plate is moved in the x direction and y direction and is rotated, the point 80 on the sealant coating groove 58 is disposed directly beneath the distal end of the nozzle portion of the sealant coating gun, and a visual field 197 of the monitoring camera is disposed on an extended line of the coating-start portion 63 which will be coated from this time. Namely, the point 80 and the visual field 197 are on the x axis in plan view.

First, from this state, coating of the sealant in the sealant coating groove 58 starts while moving the second slide plate in the x direction. Note that, hereinafter, coating of the sealant is carried out while movement in the x direction, movement in the y direction, and rotation of the second slide plate are appropriately carried out such that the sealant which was already coated is within the visual field 197 of the monitoring camera.

FIG. 15B shows a state in which the point 81 on the sealant coating groove 58 is moved up to directly beneath the nozzle portion, and the coating-start portion 63 of the sealant 61 is coated rectilinearly.

FIG. 15C shows a state in the midst of coating a first curved portion 64 of the sealant 61 by moving a point 91 on the sealant coating groove 58 up to directly beneath the nozzle portion.

In FIGS. 16A through 16C, intermediate processes of the another method for coating a sealant on a separator will be sequentially described.

FIG. 16A shows a state in the midst of coating the first straight portion 65 of the sealant 61 by moving the point 92 on the sealant coating groove 58 up to directly beneath the nozzle portion after coating of the first straight portion 64 of the sealant 61 is completed.

FIG. 16B shows a state in the midst of coating the second curved portion 66 of the sealant 61 by moving the point 93 on the sealant 61 up to directly beneath the nozzle portion after coating of the first straight portion 65 of the sealant 61 is completed.

FIG. 16C shows a state in the midst of coating the second straight portion 67 of the sealant 61 by moving the point 94 on the sealant 61 up to directly beneath the nozzle portion after coating of the second curved portion 66 of the sealant 61 is completed.

In FIGS. 17A through 17C, the latter processes of the another method for coating a sealant on a separator will be sequentially described.

FIG. 17A shows a state in the midst of coating the third curved portion 68 of the sealant 61 by moving the point 95 on the sealant 61 up to directly beneath the nozzle portion after coating of the second straight portion 67 of the sealant 61 is completed.

FIG. 17B shows a state in which the coating-end portion 71 of the sealant 61 is coated by moving the point 87 on the sealant 61 up to directly beneath the nozzle portion after coating of the third curved portion 68 of the sealant 61 is completed. At this time, coating of the sealant 61 is completed.

FIG. 17C shows a state in which the point 88 is moved to directly beneath the nozzle portion by moving the second slide plate such that the portion which will be the locus 72 runs directly beneath the nozzle portion from the state in FIG. 17B.

Figure 18:
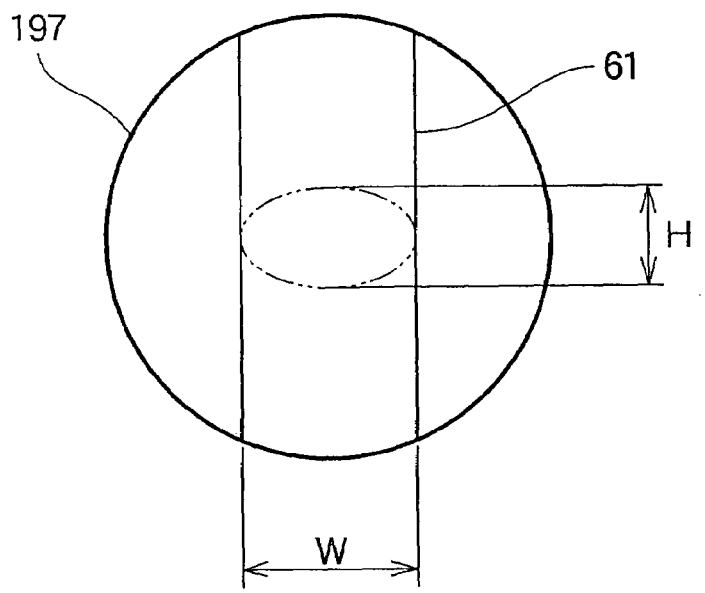
FIG. 18 is an explanatory view for explanation of the visual field of the monitoring camera according to the present invention.

FIG. 18 shows a state in which the sealant 61 is set within the visual field 197 of the monitoring camera, and it is verified whether or not the width W of the sealant 61 which was already coated is within a predetermined range. Note that the imaginary line shown in the drawing is a cross-sectional view showing a cross-section which is perpendicular to the longitudinal direction of the sealant 61.

As the outside dimensions of the sealant 61, there are the width W and the height H shown in the drawing. However, when the discharging amount from the nozzle portion, the moving velocity of the separator, the clearance between the separator surface and the nozzle portion, and the viscosity of the sealant are constant, if the width W of the sealant is changed, the height H is changed in accordance with the width W. Therefore, if only the width W is verified, it can be verified whether the coating situation of the sealant 61 is abnormal or not.

Figure 19:
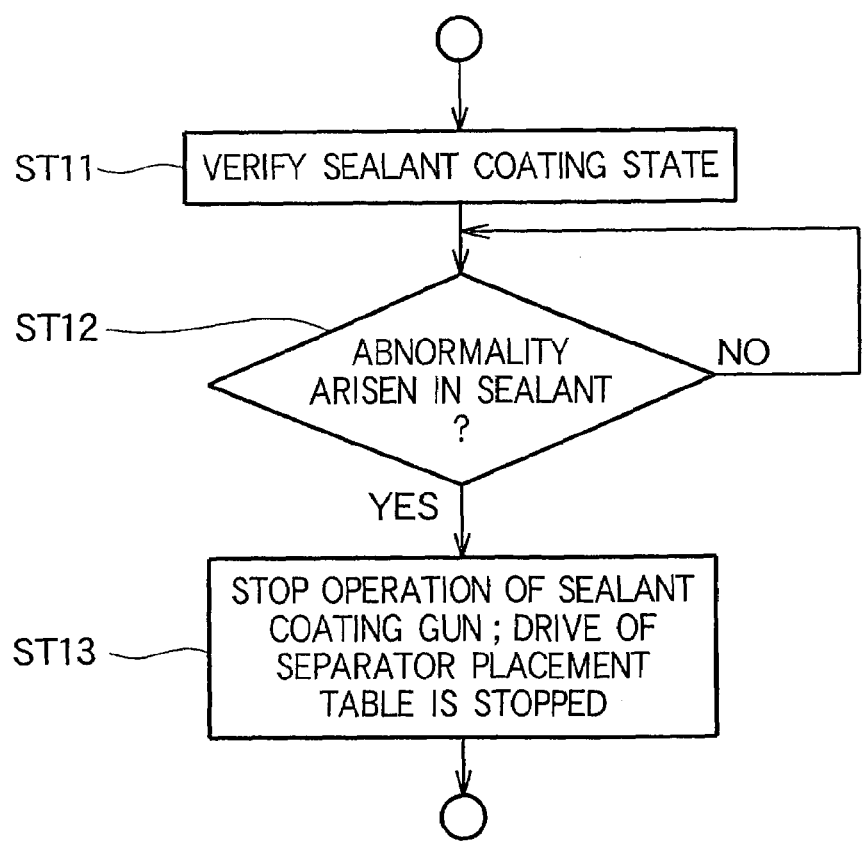
FIG. 19 is a flowchart in the midst of monitoring a state of coating a sealant according to the present invention.

FIG. 19 shows a flowchart in the midst of monitoring the coating situation of the sealant according to the present invention. Note that STxx denotes the step numbers.

ST11 . . . Verification of the coating situation of the sealant is started.

ST12 . . . It is judged whether an abnormality has arisen in the sealant or not.

When no abnormality has arisen in the sealant (NO), ST12 is executed again.

When an abnormality has arisen in the sealant (YES), the routine proceeds to ST13.

Occurrence of an abnormality is a case in which, for example, in the midst of coating the sealant, for example, the coating amount becomes small and a missing portion arises and the width W (refer to FIG. 18) is less than a predetermined range, or is a case in which the coating amount becomes large and the width W is greater than the predetermined range.

ST13 . . . Operation of the sealant coating gun is stopped, thereby stopping sealant discharging, and driving of the separator placement table is stopped, so that the abnormal situation is dealt with.

Next, a method for determining the angle of inclination of the sealant coating gun 24 will be described.

First, the standards of the height and the width of the coated sealant will be described.

Figure 20:
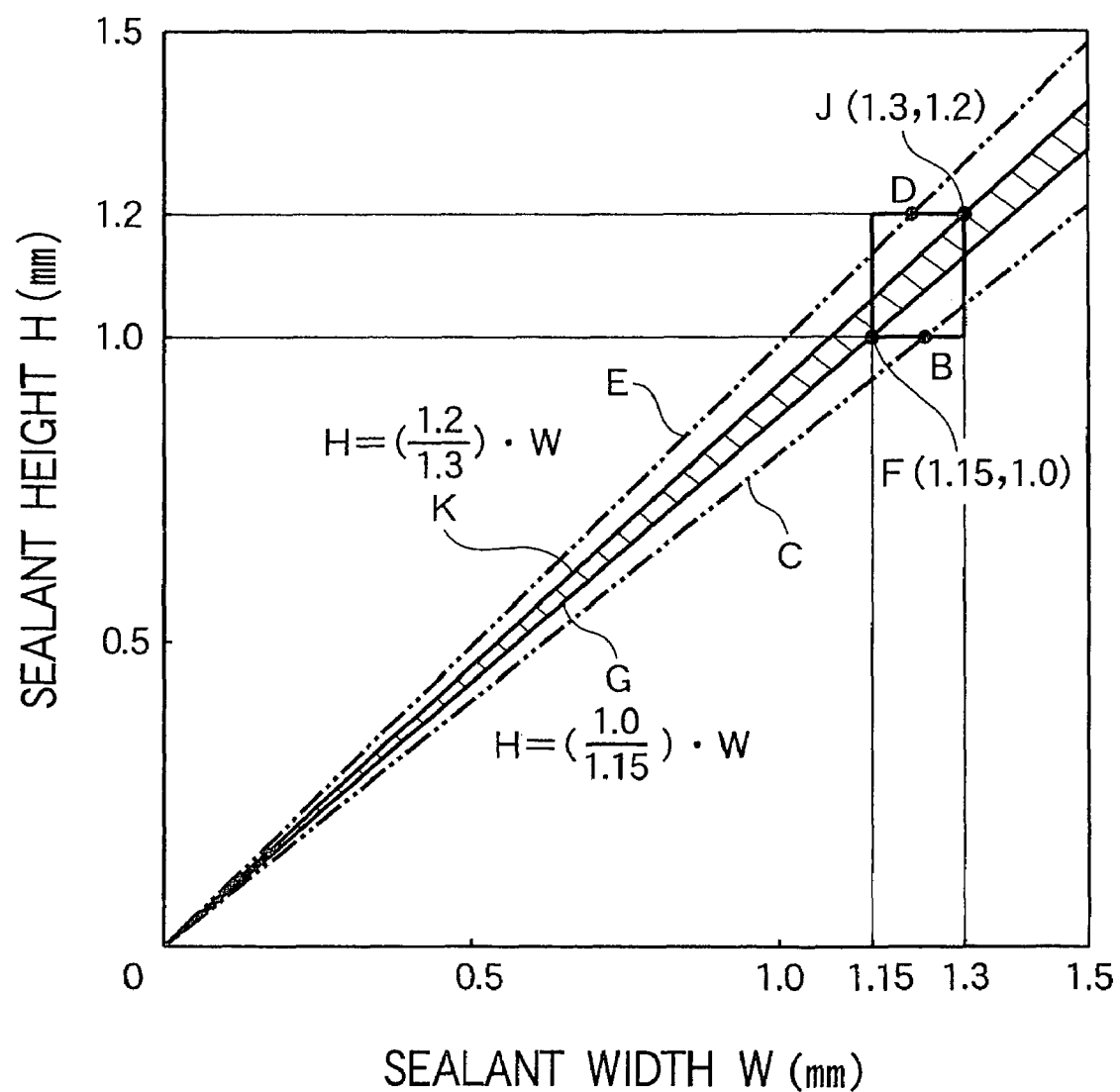
FIG. 20 is a graph showing standards of heights and widths of the sealant according to the present invention.

In a graph of FIG. 20, the ordinate denotes the sealant height H (the unit is mm, and refer to FIG. 14B), and the abscissa denotes the sealant width W (the unit is mm, and refer to FIG. 14B).

The standard of the height H of the sealant is 1.0 to 1.2 mm, and the standard of the width W is 1.15 to 1.3 mm, and the inner side of the quadrangle shown by the thick solid line in the graph is a range which satisfies the standards of both of the height H and the width W.

In accordance with the heights H in the range of the quadrangle described above and the widths W corresponding to the heights H, a limitless number of aspect ratios A can be obtained from the equation $A=H/W$.

The aspect ratio A is the slope of the straight line connecting the origin of the graph and the point within the range of the quadrangle when $H=A \cdot W$. Therefore, for example, when a straight line C is drawn so as to connect a point B within the range of the quadrangle and the origin, the aspect ratio A is constant on the straight line C.

Looking at the relationship between the straight line C and the range of the quadrangle, when the width W is changed from point B to $W=1.3$ on the straight line C, the height H is changed within the standard (1.0 to 1.2) on the straight line C.

Further, when the width W is changed from point B to $W=1.15$ on the straight line C, the height H is less than the standard (is less than 1.0) on the straight line C.

Furthermore, for example, provided that a straight line E is drawn so as to connect point D within the range of the quadrangle and the origin, the aspect ratio A a constant on the straight line E.

Looking at the relationship between the straight line E and the range of the quadrangle, when the width W is changed from point D to $W=1.15$ on the straight line E, the height H is changed within the standard (1.0 to 1.2) on the straight line E.

Also, when the width W is changed from point D to $W=1.3$ on the straight line E, the height H is greater than the standard (exceeds 1.2) on the straight line E.

In accordance with the above description, when a straight line G connecting a point F at the bottom left corner of the quadrangle (the coordinate of the point F is (1.15, 1.0)) and the origin, and a straight line K connecting a point J at the top right corner of the quadrangle (the coordinate of the point J is (1.3, 1.2)) and the origin are drawn, it can be understood that the both of the standards of the height H and the width W are satisfied on the straight line G and the straight line K, and further, on a straight line which can be drawn between the both straight lines G and K.

Because the straight line G can be expressed as $H=(1.0/1.15) \cdot W$, the aspect ratio A is $A=1.0/1.15=0.87$.

Further, because the straight line K can be expressed as $H=(1.2/1.3) \cdot W$, the aspect ratio A is $A=1.2/1.3=0.92$.

Accordingly, if the aspect ratio A satisfies $0.87 \leq A \leq 0.92$, the both standards of the sealant height H and the sealant width W can be satisfied.

In order to obtain the outside dimension of the sealant within the range of the aspect ratio determined above, the present inventor coated the sealant under the respective conditions shown in Table 1, and in particular, while changing the angle of inclination θ with respect to the vertical line of the nozzle portion at the sealant coating gun, and determined the aspect ratios of the respective sealants.

inclination θ of the nozzle portion is 30°, the sealant height H is 1.14 mm, the sealant width W is 1.17 mm, and the aspect ratio A is 0.97. Because $0.87 \leq A \leq 0.92$ which is the aforementioned range of the aspect ratio A is not satisfied, the determination is × (failing).

In accordance with the above description, angles of inclination θ of the nozzle portion of the sealant coating gun which are for making the aspect ratio A be $0.87 \leq A \leq 0.92$ are $10° \leq \theta \leq 20°$.

TABLE 1

| | Conditions | | | Results | | | |
|---|---|---|---|---|---|---|---|
| Conditions | Coating velocity V (m/sec) | Number of revolution N of motor (rpm) | Angle of inclination θ (°) | Sealant height H (mm) | Sealant width W (mm) | Aspect ratio A | Judgement |
| Comparative example 1 | 20 | 39 | 0 | 1.03 | 1.27 | 0.81 | x |
| Example 1 | 20 | 39 | 10 | 1.07 | 1.22 | 0.88 | o |
| Example 2 | 20 | 39 | 20 | 1.08 | 1.18 | 0.92 | o |
| Comparative example 2 | 20 | 39 | 30 | 1.14 | 1.17 | 0.97 | x |

In Table 1, the respective conditions for determining the aspect ratio, the results, and the judgements are sequentially described.

COMPARATIVE EXAMPLE 1

When the coating velocity V, i.e., the moving velocity of the second slide plate, is 20 m/sec, and the number of revolution N of the electric motor of the sealant coating gun is 39 rpm, and the angle of inclination θ of the nozzle portion of the sealant coating gun is 0° (namely, it is not inclined with respect to the vertical line), the sealant height H is 1.03 mm, the sealant width W is 1.27 mm, and the aspect ratio A is 0.81. Because $0.87 \leq A \leq 0.92$ which is the aforementioned range of the aspect ratio A is not satisfied, the determination is × (failing).

EXAMPLE 1

When the coating velocity V is 20 m/sec, and the number of revolution N of the electric motor is 39 rpm, and the angle of inclination θ of the nozzle portion is 10°, the sealant height H is 1.07 mm, the sealant width W is 1.22 mm, and the aspect ratio A is 0.88. Because $0.87 \leq A \leq 0.92$ which is the aforementioned range of the aspect ratio A is satisfied, the determination is o (passing).

EXAMPLE 2

When the coating velocity V is 20 m/sec, and the number of revolution N of the electric motor is 39 rpm, and the angle of inclination θ of the nozzle portion is 20°, the sealant height H is 1.08 mm, the sealant width W is 1.18 mm, and the aspect ratio A is 0.92. Because $0.87 \leq A \leq 0.92$ which is the aforementioned range of the aspect ratio A is satisfied, the determination is o (passing).

COMPARATIVE EXAMPLE 2

Figure 21:
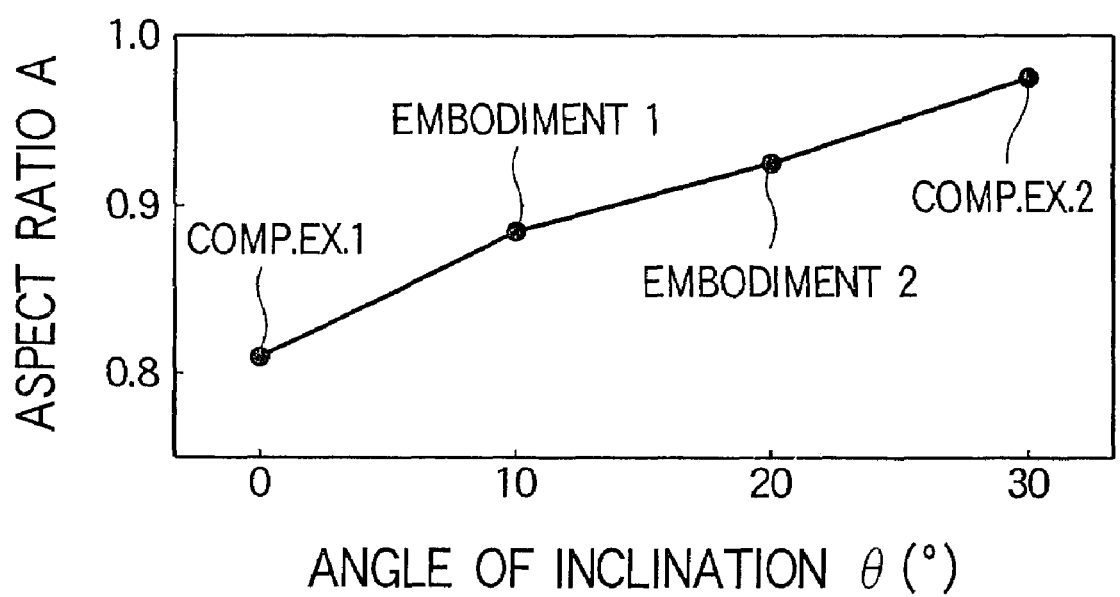
FIG. 21 is a graph showing the relationship between an angle of inclination and an aspect ratio of the sealant coating gun according to the present invention.
Figure 22:
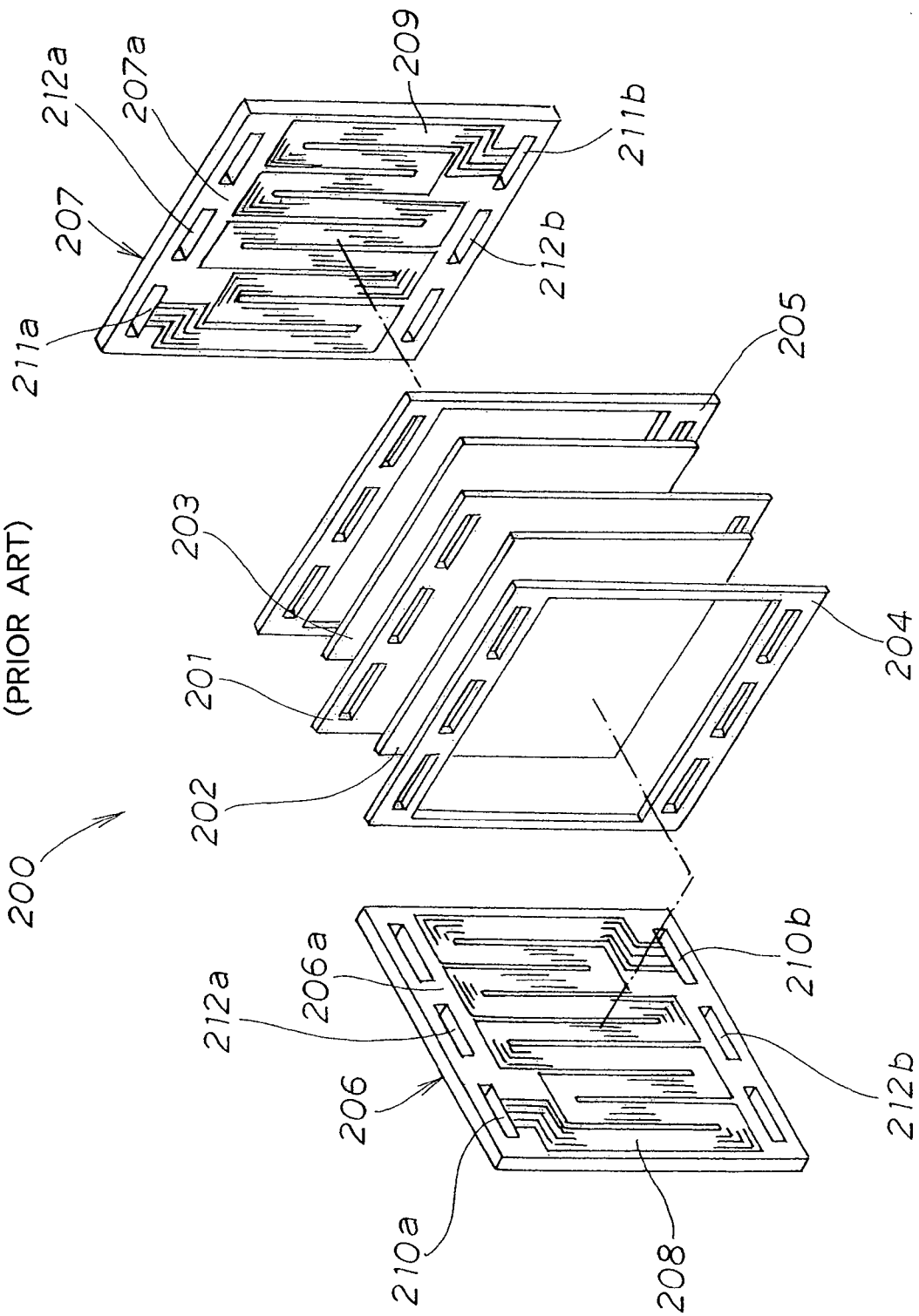
FIG. 22 is an exploded perspective view of a conventional cell for a fuel cell.
Figure 23A:
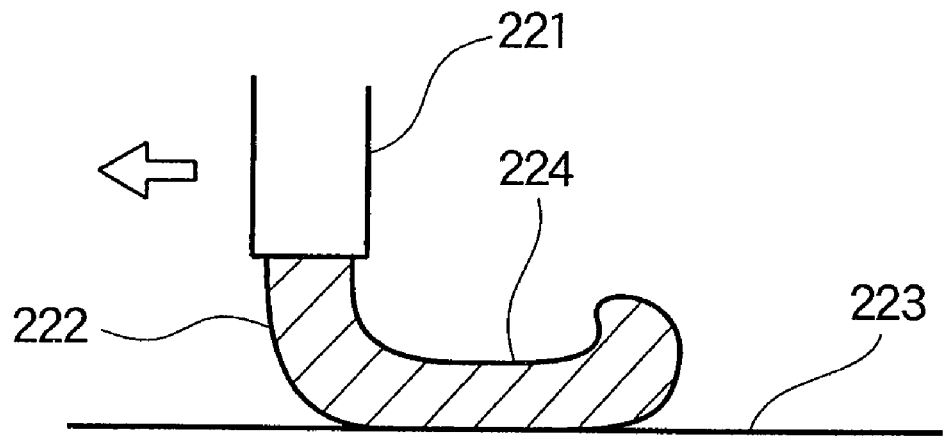
FIG. 23 is an explanatory view of a conventional sealant coating procedure.
Figure 23B:
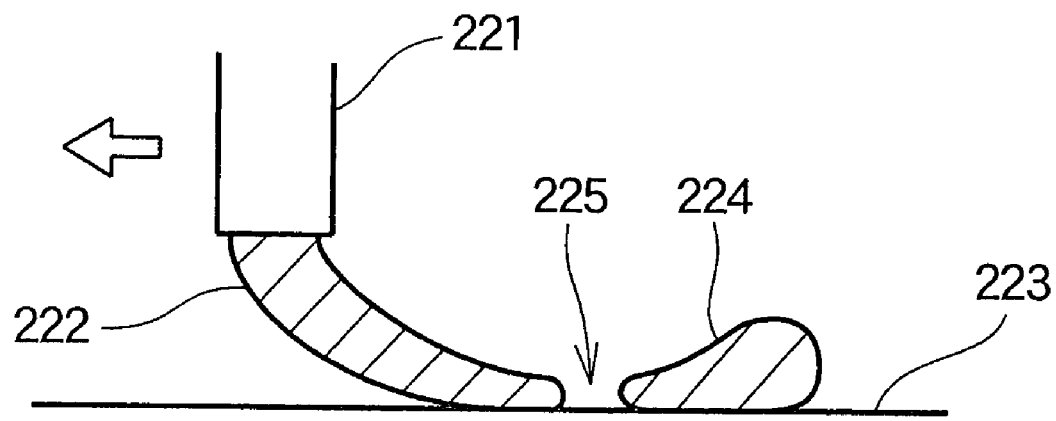
Figure 24A:
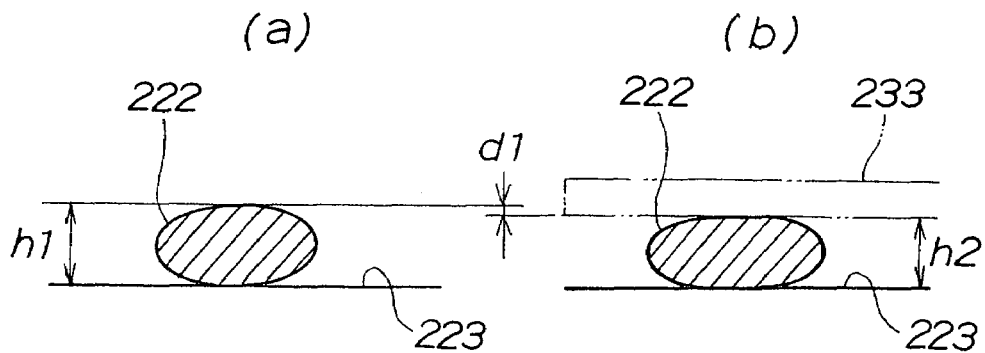
FIGS. 24A and 24C are sectional views of a sealant for explanation of problems in a conventional method for coating a sealant.
Figure 24B:
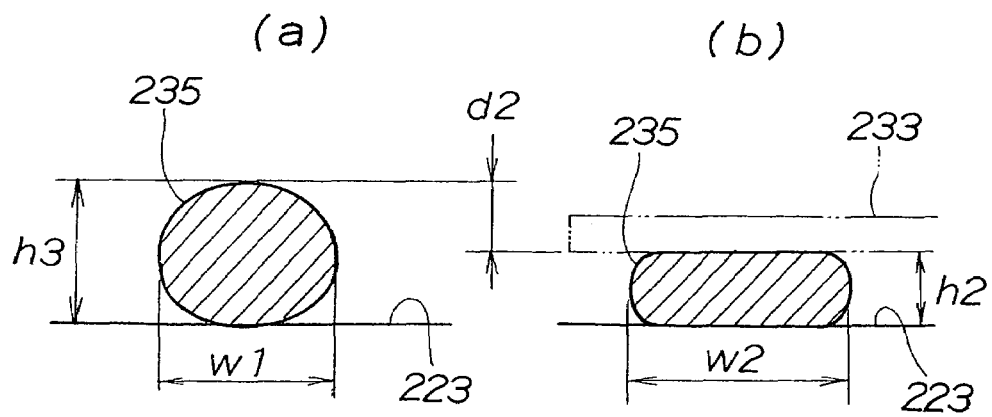
Figure 24C:
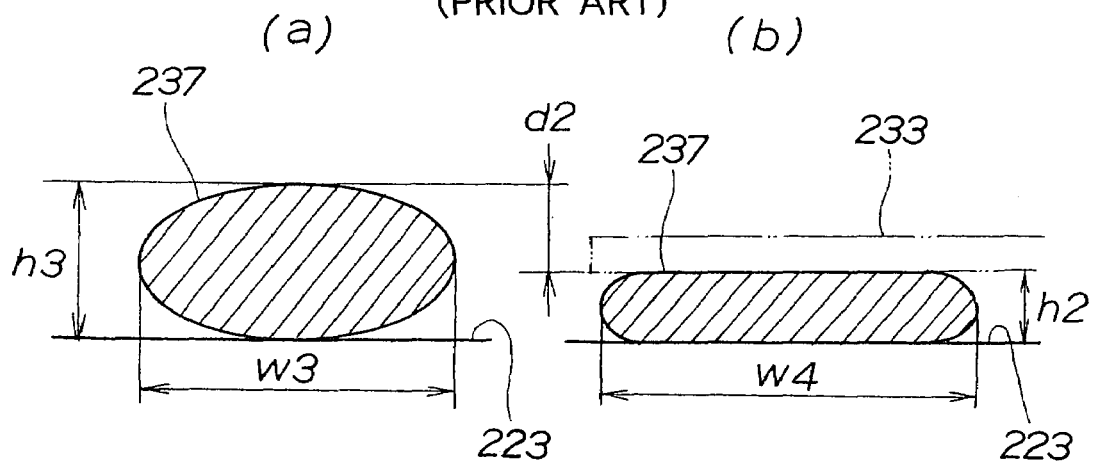

When the coating velocity V is 20 m/sec, and the number of revolution N of the electric motor is 39 rpm, and the angle of In the graph of FIG. 21, the ordinate denotes the aspect ratio A, and the abscissa denotes the angle of inclination θ of the sealant coating gun (the unit is °, and refer to FIG. 14A).

When the aspect ratios A with respect to the respective angles of inclination θ of Examples 1 and 2, and Comparative examples 1 and 2 which are shown in table 1 are plotted, there is the trend that the aspect ratio A substantially rectilinearly increases as the angles of inclination θ of the sealant coating gun become large.

From such a increasing trend and the aspect ratios determined in FIG. 20, the angle of inclination θ of the sealant coating gun is made large while satisfying the standards of the height H and the width W of the sealant. For example, by using the aspect ratio of Example 2 more than the aspect ratio of Example 1, the aspect ratio A can be made large.

Note that, in FIGS. 7B and 7C, the nozzle portion 33 is made to ascend up to the original height L1 while being moved at the horizontal moving velocity v1 from a state of being near to the separator by the predetermined distance L2. However, it is not limited thereto. First, the nozzle portion 33 may be horizontally moved at the horizontal moving velocity v1, and may next be made to ascend up to the original position, or the nozzle portion 33 may be made to ascend up to the original position, and next, the nozzle portion 33 may be horizontally moved at the horizontal moving velocity v1.

Further, in FIG. 13, movement of the first slide plate 143 and movement of the second slide plate 145 of the separator placement table 122 are carried out by the first cylinder 147 and the second cylinder 148. However, it is not limited thereto. Long screws may be respectively thread-connected to the first slide plate and the second slide plate, and the screws may be rotated by an electric motor or the like, or nuts, which are thread-connected to bolts fixed to the first slide plate and the second slide plate, may be rotated by an electric motor or the like.

INDUSTRIAL APPLICABILITY

As described above, in the method for coating a sealant according to the present invention, at a coating-start portion, a nozzle portion provided at a sealant coating apparatus is made to be nearer to the separator than at portions other than the coating-start portion, and the nozzle portion is moved at a horizontal moving velocity which is slower than at the portions other than the coating-start portion. In accordance therewith, because the sealant which is discharged can be adhered to the separator, the sealant can be coated at a more uniform thickness, and the sealant coating quality at the coating-start portion of the sealant, i.e., the sealability, can be improved. Accordingly, the present invention is useful for manufacturing a fuel cell.

The invention claimed is:

1. A method for coating a sealant on a separator for a fuel cell, comprising the steps of:

preparing a separator having a gas flow path and a water flow path;

preparing a sealant coating apparatus for coating a liquid sealant at a periphery of the gas flow path and the water flow path of the separator, said sealant coating apparatus including a nozzle portion;

at a coating-start portion of the sealant, making the nozzle portion be relatively closer to the separator than at portions other than the coating-start portion; and at the coating-start portion of the sealant, moving the nozzle portion at a horizontal moving velocity that is relatively slower than at the portions other than the coating-start portion.

2. The method for coating a sealant according to claim 1, wherein the step of making the nozzle portion relatively closer to the separator includes a step of stopping the nozzle portion for a predetermined period of time from a start of discharging the sealant.

* * * * *